(12) United States Patent
Allen et al.

(10) Patent No.: US 11,855,947 B1
(45) Date of Patent: *Dec. 26, 2023

(54) GALLERY OF EPHEMERAL MESSAGES

(71) Applicant: Snap Inc., Santa Monica, CA (US)

(72) Inventors: Nicholas Allen, Santa Monica, CA (US); Donald Giovannini, Venice, CA (US); Chiayi Lin, Venice, CA (US); Robert Murphy, Venice, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,312

(22) Filed: Jul. 29, 2016

Related U.S. Application Data

(63) Continuation of application No. 14/505,478, filed on Oct. 2, 2014, now Pat. No. 9,537,811.

(51) Int. Cl.
  *G06F 15/16* (2006.01)
  *H04L 51/42* (2022.01)
  *G06F 3/04847* (2022.01)
  *G06F 3/0482* (2013.01)
  *H04L 67/568* (2022.01)
  *G06Q 50/00* (2012.01)

(52) U.S. Cl.
  CPC ............ *H04L 51/42* (2022.05); *G06F 3/0482* (2013.01); *G06F 3/04847* (2013.01); *H04L 67/568* (2022.05); *G06Q 50/01* (2013.01)

(58) Field of Classification Search
  CPC ............... G06F 3/0482; G06F 3/04847; H04L 67/2842; H04L 51/22
  USPC ........ 709/206, 204, 217; 715/745, 753, 781, 715/205, 760
  See application file for complete search history.

(56) References Cited

U.S. PATENT DOCUMENTS

| | | | |
|---|---|---|---|
| 5,754,939 A | 5/1998 | Herz et al. |
| 5,999,932 A | 12/1999 | Paul |
| 6,038,295 A | 3/2000 | Mattes |

(Continued)

FOREIGN PATENT DOCUMENTS

| | | |
|---|---|---|
| CA | 2887596 A1 | 7/2015 |
| CA | 2894332 | 8/2018 |

(Continued)

OTHER PUBLICATIONS

US 10,075,404 B1, 09/2018, Allen et al. (withdrawn)

(Continued)

*Primary Examiner* — Thuong Nguyen
(74) *Attorney, Agent, or Firm* — Schwegman Lundberg & Woessner, P.A.

(57) ABSTRACT

A server maintains a gallery of ephemeral messages. Each ephemeral message is posted to the gallery by a user for viewing by recipients via recipient devices. In response to a gallery view request from any of the recipient devices, the ephemeral messages in the gallery are displayed on the requesting device in automated sequence, each message being displayed for a respective display duration before display of the next message in the gallery. Each ephemeral message has an associated message availability parameter. Each ephemeral message is removed from the gallery, thus being unavailable for viewing upon request, at expiry of the corresponding message availability parameter.

18 Claims, 10 Drawing Sheets

(56) References Cited

U.S. PATENT DOCUMENTS

| | | |
|---|---|---|
| 6,075,535 A | 6/2000 | Fitzhugh et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,310,694 B1 | 10/2001 | Okimoto et al. |
| 6,353,170 B1 | 3/2002 | Eyzaguirre et al. |
| 6,484,196 B1 | 11/2002 | Maurille |
| 6,487,586 B2 | 11/2002 | Ogilvie et al. |
| 6,499,016 B1 | 12/2002 | Anderson |
| 6,587,118 B1 | 7/2003 | Yoneda |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,724,403 B1 | 4/2004 | Santoro et al. |
| 6,757,713 B1 | 6/2004 | Ogilvie et al. |
| 6,898,626 B2 | 5/2005 | Ohashi |
| 6,980,909 B2 | 12/2005 | Root et al. |
| 6,981,040 B1 | 12/2005 | Konig et al. |
| 7,004,394 B2 | 2/2006 | Kim |
| 7,027,124 B2 | 4/2006 | Foote et al. |
| 7,124,164 B1 | 10/2006 | Chemtob |
| 7,142,823 B1 | 11/2006 | Logue et al. |
| 7,149,893 B1 | 12/2006 | Leonard et al. |
| 7,173,651 B1 | 2/2007 | Knowles |
| 7,203,380 B2 | 4/2007 | Chiu et al. |
| 7,243,163 B1 | 7/2007 | Friend et al. |
| 7,254,585 B2 | 8/2007 | Frieden et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,496,567 B1 | 2/2009 | Steichen |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,703,140 B2 | 4/2010 | Nath et al. |
| 7,778,973 B2 | 8/2010 | Choi |
| 7,856,449 B1 | 12/2010 | Martino et al. |
| 7,912,896 B2 | 3/2011 | Wolovitz et al. |
| 7,934,156 B2 | 4/2011 | Forstall et al. |
| 7,971,156 B2 | 6/2011 | Albertson et al. |
| 7,996,793 B2 | 8/2011 | Latta et al. |
| 8,001,204 B2 | 8/2011 | Burtner et al. |
| 8,063,797 B1 | 11/2011 | Sonnabend et al. |
| 8,073,947 B1 | 12/2011 | Yeh et al. |
| 8,098,904 B2 | 1/2012 | Ioffe et al. |
| 8,112,716 B2 | 2/2012 | Kobayashi |
| 8,127,035 B1 | 2/2012 | Hood et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,312,086 B2 | 11/2012 | Velusamy et al. |
| 8,312,097 B1 | 11/2012 | Siegel et al. |
| 8,332,475 B2 | 12/2012 | Rosen et al. |
| 8,347,021 B1 | 1/2013 | Phillips et al. |
| 8,352,494 B1 | 1/2013 | Badoiu |
| 8,379,130 B2 | 2/2013 | Forutanpour et al. |
| 8,405,773 B2 | 3/2013 | Hayashi et al. |
| 8,418,067 B2 | 4/2013 | Cheng et al. |
| 8,428,453 B1 | 4/2013 | Spiegel et al. |
| 8,471,914 B2 | 6/2013 | Sakiyama et al. |
| 8,487,938 B2 | 7/2013 | Latta et al. |
| 8,542,685 B2 | 9/2013 | Forbes, Jr. et al. |
| 8,560,612 B2 | 10/2013 | Kilmer et al. |
| 8,570,907 B2 | 10/2013 | Garcia, Jr. et al. |
| 8,639,648 B2 | 1/2014 | Koponen et al. |
| 8,661,466 B2 | 2/2014 | Stephens |
| 8,666,152 B1 | 3/2014 | Ramanathan et al. |
| 8,686,962 B2 | 4/2014 | Christie |
| 8,687,021 B2 | 4/2014 | Bathiche et al. |
| 8,713,124 B1 | 4/2014 | Weiss |
| 8,718,333 B2 | 5/2014 | Wolf et al. |
| 8,724,622 B2 | 5/2014 | Rojas |
| 8,744,523 B2 | 6/2014 | Fan et al. |
| 8,745,132 B2 | 6/2014 | Obradovich |
| 8,775,401 B2 | 7/2014 | Zhou et al. |
| 8,775,972 B2 | 7/2014 | Spiegel |
| 8,788,680 B1 | 7/2014 | Naik |
| 8,788,947 B2 | 7/2014 | Putz et al. |
| 8,797,415 B2 | 8/2014 | Arnold |
| 8,856,349 B2 | 10/2014 | Jain et al. |
| 8,856,691 B2 | 10/2014 | Geisner et al. |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,925,106 B1 | 12/2014 | Steiner et al. |
| 8,943,140 B1 | 1/2015 | Kothari |
| 8,995,433 B2 | 3/2015 | Rojas |
| 9,026,943 B1 | 5/2015 | Spiegel |
| 9,037,577 B1 | 5/2015 | Saylor et al. |
| 9,040,574 B2 | 5/2015 | Wang et al. |
| 9,055,416 B2 | 6/2015 | Rosen et al. |
| 9,063,638 B1* | 6/2015 | Schrock ............... G06F 3/0484 |
| 9,083,770 B1 | 7/2015 | Dröse et al. |
| 9,094,137 B1 | 7/2015 | Sehn et al. |
| 9,098,832 B1 | 8/2015 | Scardino |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,230,160 B1 | 1/2016 | Kanter |
| 9,237,202 B1 | 1/2016 | Sehn |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,417,754 B2 | 8/2016 | Smith |
| 9,430,783 B1 | 8/2016 | Sehn |
| 9,443,227 B2 | 9/2016 | Evans et al. |
| 9,477,391 B2 | 10/2016 | Flynn, III et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2* | 1/2017 | Allen ................... G06F 3/0482 |
| 9,542,422 B2 | 1/2017 | Duggal et al. |
| 9,560,006 B2 | 1/2017 | Prado et al. |
| 9,628,950 B1 | 4/2017 | Noeth et al. |
| 9,641,572 B1 | 5/2017 | Yeskel et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,102,423 B2 | 10/2018 | Shaburov et al. |
| 10,133,705 B1 | 11/2018 | Allen et al. |
| 10,182,311 B2 | 1/2019 | Sehn |

(56) References Cited

U.S. PATENT DOCUMENTS

| | | |
|---|---|---|
| 10,200,813 B1 | 2/2019 | Allen et al. |
| 10,284,508 B1 | 5/2019 | Allen et al. |
| 10,289,287 B2 | 5/2019 | Rathod |
| 10,311,916 B2 | 6/2019 | Sehn |
| 10,416,845 B1 | 9/2019 | Allen et al. |
| 10,438,094 B1 | 10/2019 | Ko et al. |
| 10,439,972 B1 | 10/2019 | Spiegel et al. |
| 10,448,201 B1 | 10/2019 | Sehn et al. |
| 10,475,079 B2 | 11/2019 | Hagen et al. |
| 10,476,830 B2 | 11/2019 | Allen et al. |
| 10,509,466 B1 | 12/2019 | Miller et al. |
| 10,514,876 B2 | 12/2019 | Sehn |
| 10,524,087 B1 | 12/2019 | Allen et al. |
| 10,572,681 B1 | 2/2020 | Murphy et al. |
| 10,579,869 B1 | 3/2020 | Xiong et al. |
| 10,580,458 B2 | 3/2020 | Sehn |
| 10,591,730 B2 | 3/2020 | Rodriguez, II et al. |
| 10,614,855 B2 | 4/2020 | Huang |
| 10,616,239 B2 | 4/2020 | Allen et al. |
| 10,623,891 B2 | 4/2020 | Sehn et al. |
| 10,659,914 B1 | 5/2020 | Allen et al. |
| 10,708,210 B1 | 7/2020 | Allen et al. |
| 10,748,347 B1 | 8/2020 | Li et al. |
| 10,779,113 B2 | 9/2020 | Sehn et al. |
| 10,811,053 B2 | 10/2020 | Sehn |
| 10,893,055 B2 | 1/2021 | Allen et al. |
| 10,944,710 B1 | 3/2021 | Allen et al. |
| 10,958,608 B1 | 3/2021 | Allen et al. |
| 10,962,809 B1 | 3/2021 | Castañeda |
| 10,990,697 B2 | 4/2021 | Murphy et al. |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,012,398 B1 | 5/2021 | Allen et al. |
| 11,030,454 B1 | 6/2021 | Xiong et al. |
| 11,036,368 B1 | 6/2021 | Al Majid et al. |
| 11,038,829 B1 | 6/2021 | Allen et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,166,121 B2 | 11/2021 | Sehn et al. |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,411,908 B1 | 8/2022 | Allen et al. |
| 11,522,822 B1 | 12/2022 | Allen et al. |
| 11,531,402 B1 | 12/2022 | Stolzenberg |
| 11,546,505 B2 | 1/2023 | Canberk |
| 11,627,141 B2 | 4/2023 | Allen et al. |
| 2001/0025316 A1 | 9/2001 | Oh |
| 2001/0028787 A1 | 10/2001 | Nomura et al. |
| 2002/0023101 A1 | 2/2002 | Kurihara et al. |
| 2002/0047686 A1 | 4/2002 | Kodama et al. |
| 2002/0047858 A1 | 4/2002 | Bayliss et al. |
| 2002/0047868 A1 | 4/2002 | Miyazawa |
| 2002/0078456 A1 | 6/2002 | Hudson et al. |
| 2002/0122659 A1 | 9/2002 | Mcgrath et al. |
| 2002/0128047 A1 | 9/2002 | Gates |
| 2002/0131078 A1 | 9/2002 | Tsukinokizawa |
| 2002/0141378 A1 | 10/2002 | Bays et al. |
| 2002/0144154 A1 | 10/2002 | Tomkow |
| 2002/0146103 A1 | 10/2002 | Holt et al. |
| 2002/0171669 A1 | 11/2002 | Meron et al. |
| 2003/0016247 A1 | 1/2003 | Lai et al. |
| 2003/0016253 A1* | 1/2003 | Aoki ............... G06F 3/0481 715/863 |
| 2003/0017823 A1 | 1/2003 | Mager et al. |
| 2003/0037124 A1 | 2/2003 | Yamaura et al. |
| 2003/0052925 A1 | 3/2003 | Daimon et al. |
| 2003/0074404 A1* | 4/2003 | Parker ............... H04N 7/147 709/204 |
| 2003/0101230 A1 | 5/2003 | Benschoter et al. |
| 2003/0110503 A1 | 6/2003 | Perkes |
| 2003/0126215 A1 | 7/2003 | Udell |
| 2003/0163370 A1 | 8/2003 | Chen et al. |
| 2003/0164856 A1 | 9/2003 | Prager et al. |
| 2003/0210280 A1 | 11/2003 | Baker et al. |
| 2003/0217106 A1 | 11/2003 | Adar et al. |
| 2003/0217118 A1 | 11/2003 | Kobayashi et al. |
| 2003/0236823 A1* | 12/2003 | Patzer ............... H04L 67/20 709/203 |
| 2004/0027371 A1 | 2/2004 | Jaeger |
| 2004/0059796 A1 | 3/2004 | Mclintock |
| 2004/0064429 A1 | 4/2004 | Hirstius et al. |
| 2004/0111467 A1 | 6/2004 | Willis |
| 2004/0199402 A1 | 10/2004 | Walker et al. |
| 2004/0203959 A1 | 10/2004 | Coombes |
| 2004/0205480 A1 | 10/2004 | Moore |
| 2004/0205514 A1 | 10/2004 | Sommerer et al. |
| 2004/0243531 A1 | 12/2004 | Dean |
| 2004/0243688 A1 | 12/2004 | Wugofski |
| 2005/0019014 A1 | 1/2005 | Yoo et al. |
| 2005/0024941 A1 | 2/2005 | Lasser et al. |
| 2005/0071435 A1 | 3/2005 | Karstens |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1* | 9/2005 | Anderson ............... G06F 17/24 709/204 |
| 2005/0223066 A1 | 10/2005 | Buchheit et al. |
| 2005/0253699 A1 | 11/2005 | Madonia |
| 2006/0004630 A1 | 1/2006 | Criddle et al. |
| 2006/0069734 A1 | 3/2006 | Gersh et al. |
| 2006/0109238 A1* | 5/2006 | Lau ............... G06F 3/013 345/156 |
| 2006/0114338 A1 | 6/2006 | Rothschild |
| 2006/0127054 A1 | 6/2006 | Matsuyama |
| 2006/0242239 A1 | 10/2006 | Morishima et al. |
| 2006/0242554 A1 | 10/2006 | Gerace et al. |
| 2006/0265417 A1* | 11/2006 | Amato ............... G06F 16/951 |
| 2006/0270419 A1 | 11/2006 | Crowley et al. |
| 2006/0282819 A1 | 12/2006 | Graham et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0067317 A1 | 3/2007 | Stevenson |
| 2007/0073823 A1 | 3/2007 | Cohen et al. |
| 2007/0082707 A1 | 4/2007 | Flynt et al. |
| 2007/0088832 A1 | 4/2007 | Tsang et al. |
| 2007/0010670 A1 | 5/2007 | Ahrens et al. |
| 2007/0118801 A1 | 5/2007 | Harshbarger et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2007/0268381 A1 | 11/2007 | Gastinger et al. |
| 2007/0294735 A1 | 12/2007 | Luo |
| 2008/0002776 A1 | 1/2008 | Borer et al. |
| 2008/0005240 A1* | 1/2008 | Knighton ............... G06Q 30/016 709/204 |
| 2008/0025701 A1 | 1/2008 | Ikeda |
| 2008/0033930 A1 | 2/2008 | Warren |
| 2008/0046476 A1 | 2/2008 | Anderson et al. |
| 2008/0046831 A1 | 2/2008 | Imai et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0091723 A1 | 4/2008 | Zuckerberg et al. |
| 2008/0094387 A1 | 4/2008 | Chen |
| 2008/0104503 A1 | 5/2008 | Beall et al. |
| 2008/0120409 A1 | 5/2008 | Sun et al. |
| 2008/0168146 A1 | 7/2008 | Fletcher |
| 2008/0172413 A1 | 7/2008 | Chiu |
| 2008/0184117 A1 | 7/2008 | Alsbury et al. |
| 2008/0207176 A1 | 8/2008 | Brackbill et al. |

(56) References Cited

U.S. PATENT DOCUMENTS

| | | |
|---|---|---|
| 2008/0208692 A1 | 8/2008 | Garaventi et al. |
| 2008/0222158 A1 | 9/2008 | Saika |
| 2008/0222545 A1 | 9/2008 | Lemay |
| 2008/0244438 A1 | 10/2008 | Peters et al. |
| 2008/0256446 A1 | 10/2008 | Yamamoto |
| 2008/0256450 A1 | 10/2008 | Takakura et al. |
| 2008/0256577 A1 | 10/2008 | Funaki et al. |
| 2008/0263103 A1 | 10/2008 | Mcgregor et al. |
| 2008/0266421 A1 | 10/2008 | Takahata et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2008/0316181 A1 | 12/2008 | Nurmi |
| 2009/0006565 A1 | 1/2009 | Velusamy et al. |
| 2009/0012788 A1 | 1/2009 | Gilbert et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0087161 A1 | 4/2009 | Roberts et al. |
| 2009/0089378 A1 | 4/2009 | Maresh |
| 2009/0089678 A1 | 4/2009 | Sacco et al. |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0157752 A1 | 6/2009 | Gonzalez |
| 2009/0158183 A1 | 6/2009 | Mccurdy et al. |
| 2009/0160970 A1 | 6/2009 | Fredlund et al. |
| 2009/0169062 A1 | 7/2009 | Cheung et al. |
| 2009/0177299 A1 | 7/2009 | Van De Sluis |
| 2009/0187825 A1 | 7/2009 | Sandquist et al. |
| 2009/0235155 A1 | 9/2009 | Ueda |
| 2009/0249222 A1 | 10/2009 | Schmidt et al. |
| 2009/0260010 A1 | 10/2009 | Burkhart et al. |
| 2009/0265647 A1 | 10/2009 | Martin et al. |
| 2009/0284658 A1 | 11/2009 | Cho |
| 2009/0291665 A1 | 11/2009 | Gaskarth et al. |
| 2009/0300139 A1* | 12/2009 | Shoemaker ............ G06Q 10/10 709/217 |
| 2010/0001980 A1 | 1/2010 | Kim et al. |
| 2010/0011316 A1 | 1/2010 | Sar et al. |
| 2010/0014833 A1 | 1/2010 | Pjanovic et al. |
| 2010/0039505 A1 | 2/2010 | Inoue et al. |
| 2010/0073509 A1 | 3/2010 | Shioji |
| 2010/0082427 A1 | 4/2010 | Burgener et al. |
| 2010/0082693 A1 | 4/2010 | Hugg et al. |
| 2010/0100729 A1 | 4/2010 | Read et al. |
| 2010/0115281 A1 | 5/2010 | Camenisch et al. |
| 2010/0131880 A1 | 5/2010 | Lee et al. |
| 2010/0131895 A1 | 5/2010 | Wohlert |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161831 A1 | 6/2010 | Haas et al. |
| 2010/0183280 A1 | 7/2010 | Beauregard et al. |
| 2010/0185665 A1 | 7/2010 | Horn et al. |
| 2010/0185750 A1* | 7/2010 | Nakayama ......... H04N 1/00464 709/219 |
| 2010/0185987 A1 | 7/2010 | Yang et al. |
| 2010/0191631 A1 | 7/2010 | Weidmann |
| 2010/0199227 A1 | 8/2010 | Xiao et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0241713 A1 | 9/2010 | Shimizu |
| 2010/0247064 A1 | 9/2010 | Yeh et al. |
| 2010/0250652 A1 | 9/2010 | Suzuki |
| 2010/0251143 A1* | 9/2010 | Thomas ............... G06F 16/958 715/760 |
| 2010/0257196 A1 | 10/2010 | Waters et al. |
| 2010/0273463 A1 | 10/2010 | Bonnefoy |
| 2010/0281045 A1 | 11/2010 | Dean |
| 2010/0293105 A1 | 11/2010 | Blinn et al. |
| 2010/0299763 A1 | 11/2010 | Marcus et al. |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0044549 A1 | 2/2011 | Bressan |
| 2011/0050909 A1 | 3/2011 | Ellenby et al. |
| 2011/0050915 A1 | 3/2011 | Wang et al. |
| 2011/0085059 A1 | 4/2011 | Noh |
| 2011/0093444 A1 | 4/2011 | Rose et al. |
| 2011/0099507 A1 | 4/2011 | Nesladek et al. |
| 2011/0099519 A1 | 4/2011 | Ma et al. |
| 2011/0102630 A1 | 5/2011 | Rukes |
| 2011/0106882 A1* | 5/2011 | Takakura ................ H04L 67/10 709/203 |
| 2011/0131633 A1 | 6/2011 | Macaskill et al. |
| 2011/0137782 A1 | 6/2011 | Fang |
| 2011/0141025 A1 | 6/2011 | Tsai |
| 2011/0145564 A1 | 6/2011 | Moshir et al. |
| 2011/0161423 A1 | 6/2011 | Pratt et al. |
| 2011/0184980 A1 | 7/2011 | Jeong et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0238762 A1 | 9/2011 | Soni et al. |
| 2011/0246890 A1 | 10/2011 | Mellamphy et al. |
| 2011/0249551 A1 | 10/2011 | Rollins |
| 2011/0255736 A1 | 10/2011 | Thompson et al. |
| 2011/0273575 A1 | 11/2011 | Lee |
| 2011/0283172 A1 | 11/2011 | Berger et al. |
| 2011/0283188 A1 | 11/2011 | Farrenkopf |
| 2011/0286586 A1 | 11/2011 | Saylor et al. |
| 2011/0296474 A1* | 12/2011 | Babic .................... H04N 21/21 725/87 |
| 2011/0301934 A1 | 12/2011 | Tardif |
| 2011/0302525 A1 | 12/2011 | Jeon |
| 2011/0306387 A1 | 12/2011 | Moon |
| 2011/0314084 A1 | 12/2011 | Saretto et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0036443 A1 | 2/2012 | Ohmori et al. |
| 2012/0054797 A1 | 3/2012 | Skog et al. |
| 2012/0062805 A1 | 3/2012 | Candelore |
| 2012/0070045 A1 | 3/2012 | Vesper et al. |
| 2012/0084731 A1 | 4/2012 | Filman et al. |
| 2012/0084835 A1 | 4/2012 | Thomas et al. |
| 2012/0098836 A1 | 4/2012 | Kim et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0117456 A1 | 5/2012 | Koskimies |
| 2012/0124147 A1 | 5/2012 | Hamlin et al. |
| 2012/0127196 A1 | 5/2012 | Landry |
| 2012/0131507 A1 | 5/2012 | Sparandara et al. |
| 2012/0131512 A1 | 5/2012 | Takeuchi et al. |
| 2012/0141088 A1 | 6/2012 | Isozu et al. |
| 2012/0143760 A1 | 6/2012 | Abulafia et al. |
| 2012/0158532 A1 | 6/2012 | Fitzsimmons |
| 2012/0163664 A1 | 6/2012 | Zhu |
| 2012/0165100 A1 | 6/2012 | Lalancette et al. |
| 2012/0166462 A1* | 6/2012 | Pathak ................ G06F 3/04845 707/758 |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0201362 A1 | 8/2012 | Crossan et al. |
| 2012/0203849 A1 | 8/2012 | Collins et al. |
| 2012/0208564 A1 | 8/2012 | Clark et al. |
| 2012/0209892 A1 | 8/2012 | Macaskill et al. |
| 2012/0209921 A1 | 8/2012 | Adafin et al. |
| 2012/0209924 A1 | 8/2012 | Evans et al. |
| 2012/0210244 A1 | 8/2012 | De Francisco et al. |

(56) References Cited

U.S. PATENT DOCUMENTS

| | | |
|---|---|---|
| 2012/0212632 A1 | 8/2012 | Mate et al. |
| 2012/0220219 A1 | 8/2012 | Hill et al. |
| 2012/0220264 A1 | 8/2012 | Kawabata |
| 2012/0226663 A1 | 9/2012 | Valdez et al. |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0245982 A1 | 9/2012 | Daniel |
| 2012/0250951 A1 | 10/2012 | Chen |
| 2012/0254324 A1 | 10/2012 | Majeti et al. |
| 2012/0254325 A1 | 10/2012 | Majeti et al. |
| 2012/0259815 A1 | 10/2012 | Olson |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0288147 A1 | 11/2012 | Fujitani |
| 2012/0290637 A1 | 11/2012 | Perantatos et al. |
| 2012/0299954 A1 | 11/2012 | Wada et al. |
| 2012/0304080 A1 | 11/2012 | Wormald et al. |
| 2012/0307096 A1 | 12/2012 | Bray et al. |
| 2012/0311623 A1 | 12/2012 | Davis et al. |
| 2012/0323933 A1 | 12/2012 | He et al. |
| 2012/0324018 A1 | 12/2012 | Metcalf et al. |
| 2013/0018960 A1 | 1/2013 | Knysz et al. |
| 2013/0024292 A1 | 1/2013 | David |
| 2013/0024757 A1 | 1/2013 | Doll et al. |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057489 A1 | 3/2013 | Morton |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0067028 A1 | 3/2013 | Takamura et al. |
| 2013/0071093 A1 | 3/2013 | Hanks et al. |
| 2013/0076758 A1 | 3/2013 | Li et al. |
| 2013/0082959 A1 | 4/2013 | Shimazu et al. |
| 2013/0085790 A1 | 4/2013 | Palmer et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0111514 A1 | 5/2013 | Slavin et al. |
| 2013/0117261 A1 | 5/2013 | Sambrani |
| 2013/0117389 A1 | 5/2013 | Yamada et al. |
| 2013/0128059 A1 | 5/2013 | Kristensson |
| 2013/0132477 A1 | 5/2013 | Bosworth et al. |
| 2013/0132836 A1 | 5/2013 | Ortiz |
| 2013/0132908 A1 | 5/2013 | Lee et al. |
| 2013/0144979 A1 | 6/2013 | Kansal et al. |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0210518 A1 | 8/2013 | Barclay et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0263056 A1 | 10/2013 | Son et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0283167 A1 | 10/2013 | Xu |
| 2013/0290337 A1 | 10/2013 | Lansford et al. |
| 2013/0290443 A1 | 10/2013 | Collins et al. |
| 2013/0304646 A1 | 11/2013 | De Geer |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0003739 A1 | 1/2014 | S V et al. |
| 2014/0006142 A1 | 1/2014 | Gaudet et al. |
| 2014/0011538 A1 | 1/2014 | Mulcahy et al. |
| 2014/0013243 A1 | 1/2014 | Flynn, III et al. |
| 2014/0019264 A1 | 1/2014 | Wachman et al. |
| 2014/0028589 A1 | 1/2014 | Reilly |
| 2014/0029034 A1 | 1/2014 | Toriyama |
| 2014/0032682 A1 | 1/2014 | Prado et al. |
| 2014/0043355 A1 | 2/2014 | Kim et al. |
| 2014/0045433 A1 | 2/2014 | Kim |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059479 A1 | 2/2014 | Hamburg et al. |
| 2014/0072274 A1 | 3/2014 | Nitta et al. |
| 2014/0074572 A1 | 3/2014 | Bell |
| 2014/0082651 A1 | 3/2014 | Sharifi |
| 2014/0089264 A1 | 3/2014 | Talagala et al. |
| 2014/0089314 A1 | 3/2014 | Lizuka et al. |
| 2014/0089801 A1 | 3/2014 | Agrawal |
| 2014/0118390 A1 | 5/2014 | Ioffe et al. |
| 2014/0122658 A1 | 5/2014 | Haeger et al. |
| 2014/0122787 A1 | 5/2014 | Shalvi et al. |
| 2014/0129627 A1 | 5/2014 | Baldwin et al. |
| 2014/0129953 A1 | 5/2014 | Spiegel |
| 2014/0136985 A1 | 5/2014 | Albir et al. |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0171036 A1 | 6/2014 | Simmons |
| 2014/0173457 A1 | 6/2014 | Wang et al. |
| 2014/0188815 A1 | 7/2014 | Mentz et al. |
| 2014/0189592 A1 | 7/2014 | Benchenaa et al. |
| 2014/0189937 A1 | 7/2014 | Pietrzak et al. |
| 2014/0201527 A1* | 7/2014 | Krivorot .............. H04L 63/108 713/168 |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0255001 A1 | 9/2014 | Malagón et al. |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0280140 A1 | 9/2014 | Ling et al. |
| 2014/0280537 A1 | 9/2014 | Pridmore et al. |
| 2014/0282096 A1 | 9/2014 | Rubinstein et al. |
| 2014/0289157 A1 | 9/2014 | Kenna, III et al. |
| 2014/0289597 A1 | 9/2014 | Kim |
| 2014/0289833 A1 | 9/2014 | Briceno |
| 2014/0292375 A1 | 10/2014 | Angelini et al. |
| 2014/0298210 A1 | 10/2014 | Park et al. |
| 2014/0304622 A1 | 10/2014 | Jorasch et al. |
| 2014/0317302 A1 | 10/2014 | Naik |
| 2014/0325383 A1 | 10/2014 | Brown et al. |
| 2014/0331188 A1 | 11/2014 | Sandstrom et al. |
| 2014/0355905 A1 | 12/2014 | Lipton et al. |
| 2014/0359024 A1 | 12/2014 | Spiegel |
| 2014/0359032 A1 | 12/2014 | Spiegel et al. |
| 2014/0372844 A1 | 12/2014 | Zumkhawala |
| 2014/0379683 A1 | 12/2014 | Bazaz |
| 2015/0012603 A1 | 1/2015 | Saito |
| 2015/0013016 A1 | 1/2015 | Kanter et al. |
| 2015/0020086 A1 | 1/2015 | Chen et al. |
| 2015/0040011 A1 | 2/2015 | Chun |
| 2015/0042572 A1 | 2/2015 | Lombardi et al. |
| 2015/0043033 A1* | 2/2015 | Sugimoto ............... G06F 3/013 358/1.15 |
| 2015/0046278 A1 | 2/2015 | Pei et al. |
| 2015/0055197 A1 | 2/2015 | Romanoff et al. |
| 2015/0058957 A1* | 2/2015 | Halliday ............... H04W 12/06 726/7 |
| 2015/0063724 A1 | 3/2015 | Ikeda et al. |
| 2015/0071619 A1 | 3/2015 | Brough |
| 2015/0081630 A1 | 3/2015 | Linsalata et al. |

(56) References Cited

U.S. PATENT DOCUMENTS

| | | |
|---|---|---|
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0116529 A1 | 4/2015 | Wu et al. |
| 2015/0120293 A1 | 4/2015 | Wohlert et al. |
| 2015/0127643 A1 | 5/2015 | Cohen et al. |
| 2015/0127754 A1 | 5/2015 | Clark et al. |
| 2015/0130178 A1 | 5/2015 | Clements |
| 2015/0134318 A1 | 5/2015 | Cuthbert et al. |
| 2015/0142753 A1 | 5/2015 | Soon-shiong |
| 2015/0161178 A1 | 6/2015 | Bădoiu |
| 2015/0172534 A1 | 6/2015 | Miyakawa et al. |
| 2015/0177937 A1 | 6/2015 | Poletto et al. |
| 2015/0178260 A1 | 6/2015 | Brunson |
| 2015/0186217 A1 | 7/2015 | Eslami Sarab |
| 2015/0188869 A1 | 7/2015 | Gilad et al. |
| 2015/0193685 A1 | 7/2015 | Srinivasan et al. |
| 2015/0199082 A1 | 7/2015 | Scholler et al. |
| 2015/0220606 A1 | 8/2015 | Ito et al. |
| 2015/0227602 A1 | 8/2015 | Ramu et al. |
| 2015/0242525 A1 | 8/2015 | Perlegos |
| 2015/0248683 A1 | 9/2015 | Walkingshaw |
| 2015/0312184 A1* | 10/2015 | Langholz ............ H04L 51/04 715/753 |
| 2015/0325268 A1 | 11/2015 | Berger et al. |
| 2015/0326510 A1 | 11/2015 | Tomlinson et al. |
| 2015/0334347 A1 | 11/2015 | Kang et al. |
| 2015/0339303 A1 | 11/2015 | Perlegos |
| 2015/0350136 A1 | 12/2015 | Flynn, III et al. |
| 2015/0356615 A1 | 12/2015 | Hagen et al. |
| 2015/0365795 A1 | 12/2015 | Allen et al. |
| 2015/0367233 A1 | 12/2015 | Hicks et al. |
| 2015/0370320 A1 | 12/2015 | Connor |
| 2015/0378502 A1 | 12/2015 | Hu et al. |
| 2015/0381688 A1 | 12/2015 | Jenkins et al. |
| 2016/0000020 A1 | 1/2016 | Sugimoto |
| 2016/0006927 A1 | 1/2016 | Sehn |
| 2016/0034253 A1 | 2/2016 | Bang et al. |
| 2016/0048369 A1 | 2/2016 | Zenoff |
| 2016/0050704 A1 | 2/2016 | von Sneidern et al. |
| 2016/0085773 A1 | 3/2016 | Chang et al. |
| 2016/0085863 A1 | 3/2016 | Allen et al. |
| 2016/0085994 A1 | 3/2016 | Pereira |
| 2016/0086670 A1 | 3/2016 | Gross et al. |
| 2016/0092962 A1 | 3/2016 | Wasserman et al. |
| 2016/0099901 A1 | 4/2016 | Allen et al. |
| 2016/0105387 A1 | 4/2016 | Jackson |
| 2016/0119272 A1 | 4/2016 | Rubinstein et al. |
| 2016/0134941 A1 | 5/2016 | Selvaraj |
| 2016/0139748 A1 | 5/2016 | Iwaizumi et al. |
| 2016/0149843 A1 | 5/2016 | Spicer et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0234023 A1 | 8/2016 | Mozer et al. |
| 2016/0239248 A1 | 8/2016 | Sehn |
| 2016/0239457 A1 | 8/2016 | Gross et al. |
| 2016/0253833 A1 | 9/2016 | Lew |
| 2016/0253912 A1* | 9/2016 | Heilman ............ G09B 5/08 434/309 |
| 2016/0277419 A1 | 9/2016 | Allen et al. |
| 2016/0321708 A1 | 11/2016 | Sehn |
| 2016/0345035 A1 | 11/2016 | Han et al. |
| 2016/0352659 A1* | 12/2016 | Krishnamoorth ..... H04L 51/046 |
| 2016/0359957 A1 | 12/2016 | Laliberte |
| 2016/0359987 A1 | 12/2016 | Laliberte |
| 2017/0111617 A1 | 4/2017 | Kuwahara et al. |
| 2017/0123487 A1 | 5/2017 | Hazra et al. |
| 2017/0149717 A1 | 5/2017 | Sehn |
| 2017/0161382 A1 | 6/2017 | Ouimet et al. |
| 2017/0263029 A1 | 9/2017 | Yan et al. |
| 2017/0277684 A1 | 9/2017 | Dharmarajan Mary |
| 2017/0277685 A1 | 9/2017 | Takumi |
| 2017/0287006 A1 | 10/2017 | Azmoodeh et al. |
| 2017/0295250 A1 | 10/2017 | Samaranayake et al. |
| 2017/0310888 A1 | 10/2017 | Wright et al. |
| 2017/0329481 A1 | 11/2017 | Stoop et al. |
| 2017/0351910 A1 | 12/2017 | Elwazer et al. |
| 2017/0374003 A1 | 12/2017 | Allen et al. |
| 2017/0374508 A1 | 12/2017 | Davis et al. |
| 2018/0103002 A1 | 4/2018 | Sehn |
| 2018/0131663 A1 | 5/2018 | Halliday et al. |
| 2018/0158370 A1 | 6/2018 | Pryor |
| 2018/0316575 A1 | 11/2018 | Son et al. |
| 2019/0097812 A1 | 3/2019 | Toth |
| 2019/0146219 A1 | 5/2019 | Rodriguez, II |
| 2019/0237106 A1 | 8/2019 | Sehn |
| 2019/0342699 A1 | 11/2019 | Sehn et al. |
| 2019/0372991 A1 | 12/2019 | Allen et al. |
| 2020/0057590 A1 | 2/2020 | Sehn |
| 2020/0105304 A1 | 4/2020 | Sehn |
| 2020/0193053 A1 | 6/2020 | Murphy et al. |
| 2020/0213804 A1 | 7/2020 | Sehn et al. |
| 2020/0288270 A1 | 9/2020 | Allen et al. |
| 2020/0329336 A1 | 10/2020 | Sehn et al. |
| 2020/0411058 A1 | 12/2020 | Sehn |
| 2021/0006526 A1 | 1/2021 | Allen et al. |
| 2021/0006527 A1 | 1/2021 | Allen et al. |
| 2021/0006528 A1 | 1/2021 | Allen et al. |
| 2021/0011612 A1 | 1/2021 | Dancie et al. |
| 2021/0014238 A1 | 1/2021 | Allen et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0273903 A1 | 9/2021 | Allen et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0342473 A1 | 11/2021 | Murphy et al. |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0276817 A1 | 9/2022 | Sehn |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2023/0171261 A1 | 6/2023 | Allen et al. |

FOREIGN PATENT DOCUMENTS

| | | |
|---|---|---|
| CA | 2910158 C | 6/2019 |
| CA | 3027981 | 3/2023 |
| CN | 102118419 A | 7/2011 |
| CN | 103297936 A | 9/2013 |
| CN | 103049761 B | 8/2016 |
| CN | 107004225 A | 8/2017 |
| CN | 107004225 B | 1/2021 |
| CN | 112669166 A | 4/2021 |
| EP | 3707693 A1 | 9/2020 |
| EP | 4172726 A1 | 5/2023 |
| EP | 4172730 A1 | 5/2023 |
| IT | MI20040519 | 6/2004 |
| KR | 20060043137 A | 5/2006 |
| KR | 20110094208 A | 8/2011 |
| KR | 102301618 B1 | 9/2021 |
| KR | 102475132 B1 | 12/2022 |
| KR | 20220158824 A | 12/2022 |
| WO | WO-2011040821 A1 | 4/2011 |
| WO | WO-2012000107 A1 | 1/2012 |
| WO | WO-2013008251 A2 | 1/2013 |
| WO | WO-2014093668 A1 | 6/2014 |
| WO | WO-2014194262 A2 | 12/2014 |
| WO | WO-2015192026 A1 | 12/2015 |
| WO | WO-2016007285 A1 | 1/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |

(56) References Cited

FOREIGN PATENT DOCUMENTS

| WO | WO-2016100342 A1 | 6/2016 |
|---|---|---|
| WO | WO-2016/112299 A1 | 7/2016 |
| WO | WO-2016149594 A1 | 9/2016 |
| WO | WO-2016168591 A1 | 10/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

US 10,425,370 B2, 09/2019, Allen et al. (withdrawn)
US 10,484,394 B2, 11/2019, Allen et al. (withdrawn)
US 10,503,924 B1, 12/2019, Murphy et al. (withdrawn)
Microsoft Computer Dictionary 414 (5th ed. 2002) and Random House Webster's College Dictionary 1030 (2nd Random House ed. 1999).*
"U.S. Appl. No. 14/304,855, Corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Corrected Notice of Allowance dated Jul. 22, 2016", 2 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, Notice of Allowance dated Aug. 26, 2016", 11 pgs.
"U.S. Appl. No. 14/505,478, Response filed Jan. 30, 2015 to Non Final Office Action dated Jan. 27, 2015", 10 pgs.
"U.S. Appl. No. 14/505,478, Response filed Mar. 4, 2016 to Non Final Office Action dated Sep. 4, 2015", 12 pgs.
"U.S. Appl. No. 14/505,478, Response filed Apr. 1, 2015 to Final Office Action dated Mar. 17, 2015", 6 pgs.
"U.S. Appl. No. 14/506,478, Response filed Aug. 17, 2015 to Advisory Action dated Apr. 14, 2015", 10 pgs.
"U.S. Appl. No. 14/523,728, Non Final Office Action dated Dec. 12, 2014", 10 pgs.
"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.
"U.S. Appl. No. 14/529,064, Final Office Action dated Aug. 11, 2015", 23 pgs.
"U.S. Appl. No. 14/529,064, Non Final Office Action dated Mar. 12, 2015", 20 pgs.
"U.S. Appl. No. 14/529,064, Non Final Office Action dated Apr. 18, 2016", 21 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Restriction Requirement dated Feb. 2, 2015", 5 pgs.
"U.S. Appl. No. 14/529,064, Response filed Oct. 12, 2015 to Final Office Action dated Aug. 11, 2015", 19 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Notice of Allowance dated Dec. 7, 2016", 7 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/612,692, Examiner Interview Summary dated Jan. 29, 2016", 5 pgs.
"U.S. Appl. No. 14/612,692, Examiner Interview Summary dated Jul. 6, 2016", 4 pgs.
"U.S. Appl. No. 14/612,692, Examiner Interview Summary dated Aug. 14, 2015", 3 pgs.
"U.S. Appl. No. 14/612,692, Examiner Interview Summary dated Sep. 8, 2016", 3 pgs.
"U.S. Appl. No. 14/612,692, Final Office Action dated Aug. 15, 2016", 18 pgs.
"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Response filed Feb. 23, 2016 to Final Office Action dated Nov. 23, 2015", 10 pgs.
"U.S. Appl. No. 14/612,692, Response filed Nov. 14, 2016 to Final Office Action dated Aug. 15, 2016", 15 pqs.
"U.S. Appl. No. 14/612,692, Response filed Jun. 28, 2016 to Non Final Office Action dated Mar. 28, 2016", 14 pgs.
"U.S. Appl. No. 14/612,692. Response filed Oct. 19, 2015 to Non Final Office Action dated Jul. 20, 2015", 11 pgs.

(56) References Cited

OTHER PUBLICATIONS

"U.S. Appl. No. 14/634,417, Non Final Office Action dated Aug. 30, 2016", 23 pgs.
"U.S. Appl. No. 14/634,417, Response filed Nov. 30, 2016 to Non Final Office Action dated Aug. 30, 2016", 18 pgs.
"U.S. Appl. No. 14/704,212, Non Final Office Action dated Dec. 4, 2015", 17 pgs.
"U.S. Appl. No. 14/704,212, Response filed Mar. 4, 2016 to Non Final Office Action dated Dec. 4, 2015", 11 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/967,472, Non Final Office Action dated Sep. 8, 2016", 11 pgs.
"U.S. Appl. No. 14/967,472, Preliminary Amendment filed Dec. 15, 2015", 6 pgs.
"U.S. Appl. No. 14/967,472, Response filed Dec. 5, 2016 to Non Final Office Action dated Sep. 8, 2016", 11 pgs.
"U.S. Appl. No. 15/137,608, Preliminary Amendment filed Apr. 26, 2016", 6 pgs.
"U.S. Appl. No. 15/152,975, Non Final Office Action dated Jan. 12, 2017", 36 pgs.
"U.S. Appl. No. 15/152,975, Preliminary Amendment filed May 19, 2016", 8 pgs.
"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/298,806, Preliminary Amendment filed Oct. 21, 2016", 8 pgs.
"Canadian Application Serial No. 2,894,332, Office Action dated Aug. 16, 2016", 4 pgs.
"Canadian Application Serial No. 2,910,158, Office Action dated Dec. 15, 2016", 5 pgs.
"International Application Serial No. PCT/EP2008/063682, International Search Report dated Nov. 24, 2008", 3 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Search Report dated Mar. 3, 2016", 2 pgs.
"International Application Serial No. PCT/US2015/065821, Written Opinion dated Jun. 17, 2016", 3 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"Visit Mobile Getting Started", IVISIT, (Dec. 4, 2013), 1-16.

"PearlEyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
Castelluccia, Claude, et al., "EphPub: Toward robust Ephemeral Publishing", Network Protocols (ICNP), 2011 19th IEEE International Conference on, IEEE, (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Melanson, Mike, "This text message will self destruct in 60 seconds", readwrite.com, [Online]. Retrieved from the Internet: <http://readwrite.com/2011/02/11/this_text_message_will_self destruct_in 60_seconds>, (Feb. 18, 2015).
Sawers, Paul, "Snapchat for ios lets you send photos to friends and set how long they're visible for", http ://thenextweb.com/apps/2012/05/07/ snapchat-for-ios-lets-you-send-photos-to-f riends-and-set-how-long-theyre-visible-for, (May 2012), 1-3 pgs.
Sawers, Paul, "Snapchatfor iOS Lets You Send Photos to Friends and Set How long They're Visible for", [Online]. Retrieved from the Internet: <http:/ /thenextweb.com/apps/2012/05/07/Snapchat-for-ios-lets-you-send-photos-to-friends-and-set-how-long-theyre-visiblefor/#! xCjrp>,, (May 7, 2012), 1-5.
Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.
"U.S. Appl. No. 14/510,016, Non Final Office Action dated Apr. 21, 2017".
"U.S. Appl. No. 14/612,692, Response filed May 3, 2017 to Non Final Office Action dated Jan. 3, 2017", 18 pgs.
"U.S. Appl. No. 15/224,372, Preliminary Amendment filed May 5, 2017", 10 pgs.
"U.S. Appl. No. 15/224,359, Preliminary Amendment filed Apr. 19, 2017", 8 pgs.
"Canadian Application Serial No. 2,910,158, Response filed Apr. 11, 2017 to Office Action dated Dec. 15, 2016", 21 pgs.
"International Application Serial No. PCT/US2015/053811, International Preliminary Report on Patentability dated Apr. 13, 2017", 9 pgs.
"International Application Serial No. PCT/US2015/056884, International Preliminary Report on Patentability dated May 4, 2017", 8 pgs.
U.S. Appl. No. 14/612,692, filed Feb. 3, 2015, Multichannel System.
U.S. Appl. No. 15/152,975, filed May 12, 2016, Multichannel System.
U.S. Appl. No. 15/074,029, filed Mar. 18, 2016, Geo-Fence Authorization Provisioning.
U.S. Appl. No. 14/505,478, filed Oct. 2, 2014, Ephemeral Gallery of Ephemeral Messages, U.S. Pat. No. 9,537,811.
U.S. Appl. No. 15/224,343, filed Jul. 29, 2016, Ephemeral Gallery of Visual Media Messages.
U.S. Appl. No. 15/224,355, filed Jul. 29, 2016, Ephemeral Gallery Elimination Based on Gallery and Message Timers (as amended).
U.S. Appl. No. 15/224,359, filed Jul. 29, 2016, Ephemeral Gallery User Interface With Remaining Gallery Time Indication.
U.S. Appl. No. 15/224,372, filed Jul. 29, 2016, Ephemeral Gallery User Interface With Gallery View Indication (as amended).
U.S. Appl. No. 15/224,377, filed Jul. 29, 2016, Epitemeral Gallery User Interface With Screenshots Captured Indication.
U.S. Appl. No. 15/224,365, filed Jul. 29, 2016, Ephemeral Gallery User Interface With Last Posted Message Indication (as amended).
U.S. Appl. No. 15/224,383, filed Jul. 29, 2016, Multiuser Administration Interface for Ephemeral Galleries.
U.S. Appl. No. 14/578,271, filed Dec. 19, 2014, Gallery of Videos Set to an Audio Time Line.
U.S. Appl. No. 14/967,472, filed Dec. 14, 2015, Gallery of Videos Set to an Audio Time Line.
U.S. Appl. No. 14/634,417, filed Feb. 27, 2015, Ephemeral Gallery of Ephemeral Messages With Opt-In Permanence.
U.S. Appl. No. 14/304,855, filed Jun. 13, 2014, Geo-Location Based Event, U.S. Pat. No. 9,113,301.

(56) References Cited

OTHER PUBLICATIONS

U.S. Appl. No. 14/738,069, filed Jun. 12, 2015, Geo-Location Based Event, U.S. Pat. No. 9,532,171.
U.S. Appl. No. 15/298,806, filed Oct. 20, 2016, Geo-Location Based Event Gallery.
U.S. Appl. No. 14/578,258, filed Dec. 19, 2014, Gallery of Messages From Individuals With a Shared Interest, U.S. Pat. No. 9,385,983.
U.S. Appl. No. 15/137,608, filed Apr. 25, 2016, Gallery of Messages From Individuals With a Shared Interest.
U.S. Appl. No. 14/523,728, filed Oct. 24, 2014, Messages in a Geo-Location Based Event Gallery, U.S. Pat. No. 9,094,137.
U.S. Appl. No. 14/808,283, filed Jul. 24, 2015, Prioritization of Messages Within Gallery, U.S. Pat. No. 9,430,783.
U.S. Appl. No. 15/208,460, filed Jul. 12, 2016, Prioritization of Messages Within Gallery.
"U.S. Appl. No. 14/634,417, Advisory Action dated Mar. 14, 2017", 3 pgs.
"U.S. Appl. No. 14/634,417, Final Office Action dated Jan. 31, 2017", 27 pgs.
"U.S. Appl. No. 14/634,417, Response filed Mar. 2, 2017 to Final Office Action dated Jan. 31, 2017", 23 pgs.
"U.S. Appl. No. 14/967,472, Final Office Action dated Mar. 10, 2017", 15 pgs.
"U.S. Appl. No. 15/208,460, Notice of Allowance dated Feb. 27, 2017", 8 pgs.
"U.S. Appl. No. 15/224,343, Preliminary Amendment filed Jan. 31, 2017", 10 pgs.
"U.S. Appl. No. 15/224,355, Preliminary Amendment filed Apr. 3, 2017", 12 pgs.
"U.S. Appl. No. 15/416,846, Preliminary Amendment filed Feb. 18, 2017", 10 pgs.
"How Snaps Are Stored and Deleted", Snapchat, [Online]. Retrieved from the Internet: <URL: https://web.archive.org/web/20130607042322/http://blog.snapchat.com/post/50060403002/how-snaps-are-stored-and-deleted, (May 9, 2013), 2 pgs.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.
Shein, Esther, "Ephemeral Data", Communications of the ACM vol. 56 | No. 9, (Sep. 2013), 20-22.
U.S. Appl. No. 13/973,770, filed Aug. 22, 2013, Apparatus and Method for Accelerated Display of Ephemeral Messages, U.S. Pat. No. 8,914,752.
U.S. Appl. No. 14/510,016, filed Oct. 8, 2014, Apparatus and Method for Accelerated Display of Ephemeral Messages.
U.S. Appl. No. 15/416,846, filed Jan. 26, 2017, Prioritization of Messages Within Gallery.
"U.S. Appl. No. 14/510,016, Non Final Office Action dated Feb. 7, 2018", 36 pgs.
"U.S. Appl. No. 14/967,472, Non Final Office Action dated Jan. 12, 2018", 17 pgs.
"U.S. Appl. No. 14/967,472, Response filed Mar. 16, 2018 Non Final Office Action dated Jan. 12, 2018", 13 pgs.
"U.S. Appl. No. 15/074,029, Response filed Feb. 28, 2018 to Non Final Office Action dated Nov. 30, 2017", 12 pgs.
"U.S. Appl. No. 15/152,975, Non Final Office Action dated Jan. 10, 2018", 18 pgs.
"U.S. Appl. No. 15/224,343, Response filed Mar. 5, 2018 to Non Final Office Action dated Oct. 4, 2017", 23 pgs.
"U.S. Appl. No. 15/224,355, Response filed Mar. 6, 2018 to Non Final Office Action dated Sep. 6, 2017", 25 pgs.
"U.S. Appl. No. 15/224,359, Response filed Jan. 22, 2018 to Non Final Office Action dated Jul. 20, 2017", 13 pgs.
"U.S. Appl. No. 15/224,365, Response filed Feb. 8, 2018 to Non Final Office Action dated Aug. 8, 2017", 14 pgs.
"U.S. Appl. No. 15/224,383, Final Office Action dated Feb. 14, 2018", 25 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, Response filed Jan. 9, 2018 to Final Office Action dated Oct. 24, 2017", 17 pgs.
"To Err is Human. To Self Destruct Messages, There is iDelete for iOS", The Apple Google, [Online]. Retrieved from the Internet: http://theapplegoogle.com/2013/04/err-human-destruct-messages-idelete-ios/>, archived on Apr. 12, 2013 at wayback machine>, 2 pgs.
U.S. Appl. No. 15/702,511, filed Sep. 12, 2017, Ephemeral Gallery of Ephemeral Messages.
U.S. Appl. No. 15/787,467, filed Oct. 18, 2017, Prioritization of Messages Within a Message Collection.
U.S. Appl. No. 14/723,400, filed May 27, 2015, Apparatus and Method for Automated Privacy Protection in Distributed Images, U.S. Pat. No. 9,396,354.
U.S. Appl. No. 15/212,095, filed Jul. 15, 2016, Apparatus and Method for Automated Privacy Protection in Distributed Image, U.S. Pat. No. 9,785,796.
U.S. Appl. No. 15/729,582, filed Oct. 10, 2017, Apparatus and Method for Automated Privacy Protection in Distributed Images.
"Android Getting Started Guide", Voxer Business, [Online]. Retrieved from the Internet: <https://voxer.com/assets/AndroidGuide.pdf>, (Feb. 1, 2014), 18 pgs.
"U.S. Appl. No. 14/510,016, Advisory Action dated Nov. 30, 2017".
"U.S. Appl. No. 14/510,016, Final Office Action dated Sep. 8, 2017", 21 pgs.
"U.S. Appl. No. 14/510,016, Response filed Jan. 8, 2017 to Final Office Action dated Sep. 8, 2017", 22 pgs.
"U.S. Appl. No. 14/510,016, Response Filed Jul. 21, 2017 to Non Final Office Action dated Apr. 21, 2017", 21 pgs.
"U.S. Appl. No. 14/510,016, Response filed Nov. 8, 2017 to Final Office Action dated Sep. 8, 2017", 24 pgs.
"U.S. Appl. No. 14/578,271, Corrected Notice of Allowance dated Oct. 30, 2017", 2 pgs.
"U.S. Appl. No. 14/578,271, Notice of Allowability dated Nov. 29, 2017", 3 pgs.
"U.S. Appl. No. 14/578,271, Notice of Allowance dated Aug. 1, 2017", 5 pgs.
"U.S. Appl. No. 14/612,692, Examiner Interview Summary dated Nov. 13, 2017", 13 pgs.
"U.S. Appl. No. 14/612,692, Final Office Action dated Aug. 25, 2017", 18 pgs.
"U.S. Appl. No. 14/612,692, Non Final Office Action dated Jan. 9, 2018", 19 pgs.
"U.S. Appl. No. 14/612,692, Response Filed Nov. 22, 2017 to Final Office Action dated Aug. 25, 2017", 11 pgs.
"U.S. Appl. No. 14/634,417, Examiner Interview Summary dated Aug. 7, 2017", 3 pgs.
"U.S. Appl. No. 14/634,417, Non Final Office Action dated Jun. 8, 2017", 17 pgs.
"U.S. Appl. No. 14/634,417, Notice of Allowance dated Oct. 25, 2017", 9 pgs.
"U.S. Appl. No. 14/634,417, Response filed Sep. 21, 2017 to Non Final Office Action dated Jun. 8, 2017", 16 pgs.
"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, Response filed Jan. 29, 2016 to Final Office Action dated Jan. 4, 2016", 8 pgs.
"U.S. Appl. No. 14/723,400, Response filed Aug. 13, 2015 to Non Final Office Action dated Jul. 20, 2015", 7 pgs.
"U.S. Appl. No. 14/723,400, Response filed Sep. 23, 2015 to Notice of Non Compliant Amendment dated Sep. 21, 2015", 5 pgs.
"U.S. Appl. No. 14/723,400, Response filed Nov. 19, 2015 to Notice of Non Compliant Amendment dated Nov. 10, 2015", 5 pgs.

(56) References Cited

OTHER PUBLICATIONS

"U.S. Appl. No. 14/967,472, Response filed Jun. 7, 2017 to Final Office Action dated Mar. 10, 2017", 12 pgs.
"U.S. Appl. No. 15/074,029, Non Final Office Action dated Nov. 30, 2017", 16 pgs.
"U.S. Appl. No. 15/152,975, Examiner Interview Summary dated Nov. 13, 2017", 13 pgs.
"U.S. Appl. No. 15/152,975, Final Office Action dated Jun. 30, 2017", 17 pgs.
"U.S. Appl. No. 15/152,975, Response filed Jun. 12, 2017 to Non Final Office Action dated Jan. 12, 2017", 13 pgs.
"U.S. Appl. No. 15/152,975, Response filed Nov. 30, 2017 to Final Office Action dated Jun. 30, 2017", 9 pgs.
"U.S. Appl. No. 15/212,095, Final Office Action dated Mar. 14, 2017", 9 pgs.
"U.S. Appl. No. 15/212,095, Non Final Office Action dated Feb. 2, 2017", 8 pgs.
"U.S. Appl. No. 15/212,095, Notice of Allowance dated Jun. 1, 2017", 8 pgs.
"U.S. Appl. No. 15/212,095, Notice of Allowance dated Sep. 8, 2017", 2 pgs.
"U.S. Appl. No. 15/212,095, Response filed Feb. 28, 2017 to Non Final Office Action dated Feb. 2, 2017", 2 pgs.
"U.S. Appl. No. 15/212,095, Response filed May 15, 2017 to Final Office Action dated Mar. 14, 2017", 2 pgs.
"U.S. Appl. No. 15/224,343, Non Final Office Action dated Oct. 4, 2017", 26 pgs.
"U.S. Appl. No. 15/224,355, Examiner Interview Summary dated Oct. 25, 2017", 3 pgs.
"U.S. Appl. No. 15/224,355, Non Final Office Action dated Sep. 6, 2017", 30 pgs.
"U.S. Appl. No. 15/224,359, Non Final Office Action dated Jul. 20, 2017", 33 pgs.
"U.S. Appl. No. 15/224,365, Non Final Office Action dated Aug. 8, 2017", 41 pgs.
"U.S. Appl. No. 15/224,372, Non Final Office Action dated Aug. 7, 2017", 40 pgs.
"U.S. Appl. No. 15/224,372, Response filed Jan. 8, 2017 to Non Final Office Action dated Aug. 7, 2017", 22 pgs.
"U.S. Appl. No. 15/224,377, Final Office Action dated Jan. 2, 2018", 29 pgs.
"U.S. Appl. No. 15/224,377, Non Final Office Action dated Aug. 4, 2017", 41 pgs.
"U.S. Appl. No. 15/224,377, Response filed Dec. 6, 2017 to Non Final Office Action dated Aug. 4, 2017", 22 pgs.
"U.S. Appl. No. 15/224,383, Examiner Interview Summary dated Oct. 25, 2017", 3 pgs.
"U.S. Appl. No. 15/224,383, Non Final Office Action dated Aug. 30, 2017", 26 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action dated Aug. 30, 2017", 25 pgs.
"U.S. Appl. No. 15/298,806, Final Office Action dated Oct. 24, 2017", 15 pgs.
"U.S. Appl. No. 15/298,806, Non Final Office Action dated Jun. 12, 2017", 26 pgs.
"U.S. Appl. No. 15/298,806, Response filed Sep. 12, 2017 to Non Final Office Action dated Jun. 12, 2017", 12 pgs.
"U.S. Appl. No. 15/416,846, Notice of Allowance dated Jul. 19, 2017", 9 pgs.
"U.S. Appl. No. 15/702,511, Preliminary Amendment filed Sep. 15, 2017", 13 pgs.
"U.S. Appl. No. 15/787,467, Preliminary Amendment filed Oct. 26, 2017", 11 pgs.
"Canadian Application Serial No. 2,894,332, Response filed Jan. 24, 2017 to Office Action dated Aug. 16, 2016", 15 pgs.
"European Application Serial No. 14804343.3, Extended European Search Report dated Sep. 29, 2016", 12 pgs.

"European Application Serial No. 15782165.3, Response filed Oct. 17, 2017 to Communication pursuant to Rules 161(1) and 162 EPC dated May 10, 2017", 15 pgs.
"European Application Serial No. 15870874.3, Extended European Search Report dated Nov. 29, 2017", 7 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
"International Application Serial No. PCT/US2015/065785, International Preliminary Report on Patentability dated Jun. 29, 2017", 7 pgs.
"International Application Serial No. PCT/US2015/065821, International Preliminary Report on Patentability dated Jun. 29, 2017", 5 pgs.
"International Application Serial No. PCT/US2016/023085, International Preliminary Report on Patentability dated Sep. 28, 2017", 8 pgs.
Fajman, "An Extensible Message Format for Message Disposition Notifications", Request for Comments: 2298, National Institutes of Health, (Mar. 1998), 28 pgs.
"U.S. Appl. No. 14/510,016, Response filed Aug. 23, 2018 to Final Office Action dated May 22, 2018", 16 pgs.
"U.S. Appl. No. 15/074,029, Response filed Aug. 28, 2018 to Final Office Action dated Jun. 28, 2018", 21 pgs.
"U.S. Appl. No. 15/224,343, Non Final Office Action dated Sep. 4, 2018", 20 pgs.
"U.S. Appl. No. 15/224,359, Response filed Sep. 4, 2018 to Final Office Action dated Apr. 2, 2018", 14 pgs.
"U.S. Appl. No. 15/224,372, Non Final Office Action dated Sep. 14, 2018", 20 pgs.
"U.S. Appl. No. 14/510,016, Final Office Action dated May 22, 2018".
"U.S. Appl. No. 14/510,016, Response Filed May 7, 2018 to Non Final Office Action dated Feb. 7, 2018", 13 pgs.
"U.S. Appl. No. 14/612,692, Examiner Interview Summary dated May 14, 2018", 3 pgs.
"U.S. Appl. No. 14/612,692, Notice of Allowance dated Jul. 5, 2018", 11 pgs.
"U.S. Appl. No. 14/612,692, Response Filed May 9, 2018 to Non Final Office Action dated Jan. 9, 2018", 15 pgs.
"U.S. Appl. No. 14/634,417, Notice of Allowance dated May 22, 2018", 9 pgs.
"U.S. Appl. No. 14/967,472, Final Office Action dated Jun. 25, 2018", 14 pgs.
"U.S. Appl. No. 15/074,029, Final Office Action dated Jun. 28, 2018", 22 pgs.
"U.S. Appl. No. 15/152,975, Examiner Interview Summary dated May 14, 2018", 3 pgs.
"U.S. Appl. No. 15/152,975, Final Office Action dated Jul. 2, 2018", 19 pgs.
"U.S. Appl. No. 15/152,975, Response Filed May 10, 2018 to Non Final Office Action dated Jan. 10, 2018", 13 pgs.
"U.S. Appl. No. 15/224,343, Final Office Action dated Apr. 19, 2018", 20 pgs.
"U.S. Appl. No. 15/224,343, Response filed Jul. 19, 2018 to Final Office Action dated Apr. 19, 2018", 16 pgs.
"U.S. Appl. No. 15/224,355, Final Office Action dated Apr. 24, 2018", 20 pgs.
"U.S. Appl. No. 15/224,359, Final Office Action dated Apr. 2, 2018", 18 pgs.
"U.S. Appl. No. 15/224,365, Final Office Action dated Apr. 2, 2018", 19 pgs.
"U.S. Appl. No. 15/224,372, Final Office Action dated Apr. 3, 2018", 18 pgs.
"U.S. Appl. No. 15/224,372, Response filed Aug. 3, 2018 to Final Office Action dated Apr. 3, 2018", 14 pgs.
"U.S. Appl. No. 15/224,377, Non Final Office Action dated Jun. 15, 2018", 19 pgs.

(56) References Cited

OTHER PUBLICATIONS

"U.S. Appl. No. 15/224,383, Examiner Interview Summary dated Aug. 15, 2018", 4 pgs.
"U.S. Appl. No. 15/224,383, Non Final Office Action dated Jul. 5, 2018", 19 pgs.
"U.S. Appl. No. 15/224,383, Response filed Jun. 14, 2018 to Final Office Action dated Feb. 14, 2018", 14 pgs.
"U.S. Appl. No. 15/298,806, Examiner Interview Summary dated Aug. 13, 2018", 3 pgs.
"U.S. Appl. No. 15/298,806, Non Final Office Action dated May 17, 2018", 16 pgs.
"U.S. Appl. No. 15/298,806, Response filed Aug. 10, 2018 to Non Final Office Action dated May 17, 2018", 15 pgs.
"U.S. Appl. No. 15/729,582, Non Final Office Action dated May 25, 2018", 14 pgs.
"U.S. Appl. No. 15/787,467, Non Final Office Action dated Apr. 18, 2018", 17 pgs.
"U.S. Appl. No. 15/787,467, Response filed Jul. 18, 2018 to Non Final Office Action dated Apr. 18, 2018", 12 pgs.
"U.S. Appl. No. 16/000,657, Preliminary Amendment filed Jun. 6, 2018", 8 pgs.
"Canadian Application Serial No. 2,894,332, Request for Reinstatement filed Jun. 11, 2018", w/ Amended Claims, 17 pgs.
"Canadian Application Serial No. 2,910,158, Office Action dated Jun. 6, 2018", 5 pgs.
Chen, Datong, et al., "Protecting Personal Identification in Video", Protecting Privacy in Video Surveillance, Springer-Verlag London Ltd., (2009), 115-128.
Vaas, Lisa, "StealthText, Should You Choose to Accept It", URL: http://www.eweek.com/print/c/a/MessagingandCollaboration/StealthTextShouldYouChoosetoAcceptIt, (Dec. 13, 2005), 2 pgs.
"U.S. Appl. No. 15/787,467, Notice of Allowance dated Aug. 31, 2018", 8 pgs.
"U.S. Appl. No. 14/510,016, Final Office Action dated Sep. 7, 2018", 34 pgs.
"U.S. Appl. No. 15/298,806, Notice of Allowance dated Sep. 19, 2018", 5 pgs.
"European Application Serial No. 15782165.3, Communication Pursuant to Article 94(3) EPC dated Sep. 14, 2018", 7 pgs.
"U.S. Appl. No. 15/152,975, Response filed Sep. 19, 2018 to Final Office Action dated Jul. 2, 2018", 14 pgs.
"U.S. Appl. No. 15/787,467, Corrected Notice of Allowability dated Sep. 24, 2018", 2 pgs.
"U.S. Appl. No. 15/224,355, Response filed Sep. 24, 2018 to Final Office Action dated Apr. 24, 2018", 19 pgs.
"U.S. Appl. No. 14/967,472, Response filed Sep. 21, 2018 to Final Office Action dated Jun. 25, 2018", 11 pgs.
"U.S. Appl. No. 15/224,359, Non Final Office Action dated Sep. 28, 2018", 15 pgs.
"U.S. Appl. No. 15/152,975, Non Final Office Action dated Sep. 28, 2018", 28 pgs.
U.S. Appl. No. 16/212,313, filed Dec. 6, 2018, Apparatus and Method for Accelerated Display of Ephemeral Messages.
U.S. Appl. No. 16/376,598, filed Apr. 5, 2019, Gallery of Videos Set to an Audio Time Line.
U.S. Appl. No. 16/219,577, filed Dec. 13, 2018, Geo-Location Based Event Gallery.
U.S. Appl. No. 16/204,886, filed Nov. 29, 2018, Prioritization of Messages Within a Message Collection.
"U.S. Appl. No. 14/634,417, Corrected Notice of Allowability dated Mar. 11, 2019", 3 pgs.
"U.S. Appl. No. 14/634,417, Corrected Notice of Allowability dated Mar. 20, 2019", 3 pgs.
"U.S. Appl. No. 14/967,472, Corrected Notice of Allowability dated Mar. 18, 2019", 3 pgs.
"U.S. Appl. No. 14/967,472, Notice of Allowance dated Jan. 24, 2019", 6 pgs.
"U.S. Appl. No. 15/074,029, Advisory Action dated Oct. 11, 2018", 3 pgs.
"U.S. Appl. No. 15/074,029, Non Final Office Action dated Jan. 23, 2019", 19 pgs.
"U.S. Appl. No. 15/137,608, Amendment and Response filed Jan. 25, 2019 to Non Final Office Action dated Nov. 2, 2018", 13 pgs.
"U.S. Appl. No. 15/137,608, Non Final Office Action dated Nov. 2, 2018", 10 pgs.
"U.S. Appl. No. 15/152,975, Examiner Interview Summary dated Feb. 4, 2019", 7 pgs.
"U.S. Appl. No. 15/152,975, Response filed Jan. 28, 2019 to Non Final Office Action dated Sep. 28, 2018", 17 pgs.
"U.S. Appl. No. 15/224,343, Amendment and Response filed Feb. 4, 2019 to Non Final Office Action dated Sep. 4, 2018", 18 pgs.
"U.S. Appl. No. 15/224,343, Final Office Action dated Mar. 22, 2019", 17 pgs.
"U.S. Appl. No. 15/224,355, Non Final Office Action dated Dec. 20, 2018", 14 pgs.
"U.S. Appl. No. 15/224,359, Respone filed Feb. 28, 2019 to Non Final Office Action dated Aug. 28, 2018", 16 pgs.
"U.S. Appl. No. 15/224,365, Non Final Office Action dated Jan. 3, 2019", 11 pgs.
"U.S. Appl. No. 15/224,365, Resonse filed Oct. 2, 2018 to Final Office Action dated Apr. 2, 2018", 15 pgs.
"U.S. Appl. No. 15/224,372, Final Office Action dated Mar. 6, 2019", 17 pgs.
"U.S. Appl. No. 15/224,372, Resonse filed Jan. 16, 2019 to Non Final Office Action dated Sep. 14, 2018", 18 pgs.
"U.S. Appl. No. 15/224,377, Examiner Interview Summary dated Mar. 4, 2019", 5 pgs.
"U.S. Appl. No. 15/224,377, Final Office Action dated Feb. 6, 2019", 14 pgs.
"U.S. Appl. No. 15/224,377, Response filed Dec. 17, 2018 to Non Final Office Action dated Jun. 15, 2018", 13 pgs.
"U.S. Appl. No. 15/224,383, Final Office Action dated Jan. 14, 2019", 15 pgs.
"U.S. Appl. No. 15/224,383, Response Filed Dec. 5, 2018 to Non Final Office Action dated Jul. 5, 2018", 16 pgs.
"U.S. Appl. No. 15/702,511, Notice of Allowance dated Mar. 26, 2019", 7 pgs.
"U.S. Appl. No. 15/702,511, Notice of Allowance dated Oct. 26, 2018", 7 pgs.
"U.S. Appl. No. 15/729,582, Final Office Action dated Dec. 13, 2018", 14 pgs.
"U.S. Appl. No. 15/946,990, Non Final Office Action dated Dec. 3, 2018", 10 pgs.
"U.S. Appl. No. 15/946,990, Response filed Feb. 20, 2019 to Non Final Office Action dated Dec. 3, 2018", 11 pgs.
"U.S. Appl. No. 16/204,886, Non Final Office Action dated Jan. 4, 2019", 8 pgs.
"U.S. Appl. No. 16/204,886, Resposne filed Apr. 2, 2019 to Non Final Office Action dated Jan. 4, 2019", 8 pgs.
"U.S. Appl. No. 16/212,313, Preliminary Amendment filed Dec. 12, 2018", 6 pgs.
"Canadian Application Serial No. 2,910,158, Response filed Dec. 6, 2018 to Office Action dated Jun. 6, 2018", w/ English Claims, 18 pgs.
"European Application Serial No. 15782165.3, Response filed Jan. 24, 2019 to Communication Pursuant to Article 94(3) EPC dated Sep. 14, 2018", w/ English Claims, 56 pgs.
U.S. Appl. No. 16/529,461, filed Aug. 1, 2019, Multichannel System.
U.S. Appl. No. 16/541,919, filed Aug. 15, 2019, Geo-Fence Authorization Provisioning.
U.S. Appl. No. 16/511,834, filed Jul. 15, 2019, Prioritization of Messages Within a Message Collection.
"U.S. Appl. No. 14/967,472, Corrected Notice of Allowability dated Apr. 24, 2019", 3 pgs.
"U.S. Appl. No. 15/074,029, Corrected Notice of Allowability dated Aug. 20, 2019", 10 pgs.
"U.S. Appl. No. 15/074,029, Notice of Allowance dated Jun. 19, 2019", 14 pgs.
"U.S. Appl. No. 15/074,029, Response filed Apr. 23, 2019 to Non Final Office Action dated Jan. 23, 2019", 15 pgs.

(56) References Cited

OTHER PUBLICATIONS

"U.S. Appl. No. 15/137,608, Corrected Notice of Allowability dated Oct. 2, 2019", 3 pgs.
"U.S. Appl. No. 15/137,608, Final Office Action dated May 13, 2019", 10 pgs.
"U.S. Appl. No. 15/137,608, Notice of Allowance dated Aug. 8, 2019", 7 pgs.
"U.S. Appl. No. 15/137,608, Response filed Jul. 12, 2019 to Final Office Action dated May 13, 2019", 10 pgs.
"U.S. Appl. No. 15/152,975, Notice of Allowance dated May 17, 2019", 13 pgs.
"U.S. Appl. No. 15/224,343, Response filed Aug. 22, 2019 to Final Office Action dated Mar. 22, 2019", 16 pgs.
"U.S. Appl. No. 15/224,355, Final Office Action dated Aug. 9, 2019", 15 pgs.
"U.S. Appl. No. 15/224,355, Response filed May 20, 2019 to Non Final Office Action dated Dec. 20, 2018", 13 pgs.
"U.S. Appl. No. 15/224,359, Final Office Action dated Apr. 11, 2019", 15 pgs.
"U.S. Appl. No. 15/224,359, Response filed Sep. 11, 2019 to Final Office Action dated Apr. 11, 2019", 18 pgs.
"U.S. Appl. No. 15/224,365, Final Office Action dated Aug. 23, 2019", 12 pgs.
"U.S. Appl. No. 15/224,365, Response filed Jun. 3, 2019 to Non-Final Office Action dated Jan. 3, 2019", 12 pgs.
"U.S. Appl. No. 15/224,372, Non Final Office Action dated Oct. 16, 2019", 14 pgs.
"U.S. Appl. No. 15/224,372, Response filed Jul. 8, 2019 to Final Office Action dated Mar. 6, 2019", 14 pgs.
"U.S. Appl. No. 15/224,377, Non Final Office Action dated Oct. 15, 2019", 12 pgs.
"U.S. Appl. No. 15/224,377, Response filed Jun. 6, 2019 to Final Office Action dated Feb. 6, 2019", 10 pgs.
"U.S. Appl. No. 15/224,383, Non-Final Office Action dated Sep. 23, 2019", 13 pgs.
"U.S. Appl. No. 15/224,383, Response filed May 14, 2019 to Final Office Action dated Jan. 14, 2019", 15 pgs.
"U.S. Appl. No. 15/702,511, 312 Amendment filed Jun. 26, 2019", 11 pgs.
"U.S. Appl. No. 15/702,511, Notice of Allowability dated Sep. 30, 2019", 2 pgs.
"U.S. Appl. No. 15/702,511, PTO Response to Rule 312 Communication dated Aug. 13, 2019", 2 pgs.
"U.S. Appl. No. 15/729,582, Corrected Notice of Allowability dated Oct. 2, 2019", 3 pgs.
"U.S. Appl. No. 15/729,582, Notice of Allowance dated Jul. 22, 2019", 9 pgs.
"U.S. Appl. No. 15/729,582, Response filed May 13, 2019 to Final Office Action dated Dec. 13, 2018", 9 pgs.
"U.S. Appl. No. 15/946,990, Final Office Action dated May 9, 2019", 11 pgs.
"U.S. Appl. No. 15/946,990, Notice of Allowance dated Sep. 24, 2019", 5 pgs.
"U.S. Appl. No. 15/946,990, Response filed Jul. 9, 2019 to Final Office Action dated May 9, 2019", 12 pgs.
"U.S. Appl. No. 16/204,886, Corrected Notice of Allowability dated Jul. 15, 2019", 2 pgs.
"U.S. Appl. No. 16/204,886, Corrected Notice of Allowability dated Aug. 6, 2019", 2 pgs.
"U.S. Appl. No. 16/204,886, Corrected Notice of Allowability dated Sep. 10, 2019", 2 pgs.
"U.S. Appl. No. 16/204,886, Notice of Allowance dated May 15, 2019", 9 pgs.
"U.S. Appl. No. 16/212,313, Non Final Office Action dated Aug. 30, 2019", 18 pgs.
"U.S. Appl. No. 16/219,577, Response filed Oct. 3, 2019 to Restriction Requirement dated Aug. 7, 2019", 6 pgs.
"U.S. Appl. No. 16/219,577, Restriction Requirement dated Aug. 7, 2019", 6 pgs.
"U.S. Appl. No. 16/376,598, Non Final Office Action dated Jul. 25, 2019", 7 pgs.
"U.S. Appl. No. 16/376,598, Notice of Allowance dated Oct. 18, 2019", 5 pgs.
"U.S. Appl. No. 16/376,598, Response filed Oct. 7, 2019 to Non-Final Office Action dated Jul. 25, 2019", 2 pgs.
"U.S. Appl. No. 16/511,834, Non-Final Office Action dated Aug. 20, 2019", 11 pgs.
"U.S. Appl. No. 16/511,834, Notice of Allowance dated Oct. 23, 2019", 8 pgs.
"U.S. Appl. No. 16/511,834, Response filed Oct. 7, 2019 to Non-Final Office Action dated Aug. 20, 2019", 3 pgs.
"European Application Serial No. 15782165.3, Summons to Attend Oral Proceedings mailed Sep. 18, 2019", 6 pgs.
Wagner, Kurt, "Snapchat Rolls Out Group-Sharing Feature for Concerts, Live Events", Mashable, [Online] Retrieved from the Internet on Sep. 12, 2019: <URL: https://mashable.com/2014/06/17/snapchat-our-story/?europe=true>, (Jun. 17, 2014), 16 pgs.
"U.S. Appl. No. 15/074,029, Corrected Notice of Allowability dated Feb. 5, 2020", 4 pgs.
"U.S. Appl. No. 15/224,343, Final Office Action dated Apr. 7, 2020", 16 pgs.
"U.S. Appl. No. 15/224,343, Non Final Office Action dated Nov. 12, 2019", 16 pgs.
"U.S. Appl. No. 15/224,343, Response filed Mar. 2, 2020 to Non Final Office Action dated Nov. 12, 2019", 17 pgs.
"U.S. Appl. No. 15/224,355, Non Final Office Action dated Jan. 22, 2020", 13 pgs.
"U.S. Appl. No. 15/224,355, Response filed Nov. 11, 2019 to Final Office Action dated Aug. 9, 2019", 14 pgs.
"U.S. Appl. No. 15/224,359, Non Final Office Action dated Dec. 10, 2019", 12 pgs.
"U.S. Appl. No. 15/224,359, Response filed Apr. 10, 2020 to Non Final Office Action dated Dec. 10, 2019", 11 pgs.
"U.S. Appl. No. 15/224,365, Non Final Office Action dated Mar. 13, 2020", 9 pgs.
"U.S. Appl. No. 15/224,365, Response filed Jan. 23, 2020 to Final Office Action dated Aug. 23, 2019", 13 pgs.
"U.S. Appl. No. 15/224,372, Response filed Apr. 16, 2020 to Non Final Office Action dated Oct. 16, 2019", 14 pgs.
"U.S. Appl. No. 15/224,377, Response filed Apr. 15, 2020 to Non Final Office Action dated Oct. 15, 2019", 13 pgs.
"U.S. Appl. No. 15/224,383, Notice of Allowance dated Feb. 27, 2020", 7 pgs.
"U.S. Appl. No. 15/224,383, Response filed Jan. 23, 2020 to Non Final Office Action dated Sep. 23, 2019", 14 pgs.
"U.S. Appl. No. 15/729,582, Corrected Notice of Allowability dated Oct. 30, 2019", 3 pgs.
"U.S. Appl. No. 15/947,350, Non Final Office Action dated Dec. 13, 2019", 20 pgs.
"U.S. Appl. No. 15/947,350, Response filed Apr. 13, 2020 to Non Final Office Action dated Dec. 13, 2019", 12 pgs.
"U.S. Appl. No. 16/000,657, Non Final Office Action dated Mar. 6, 2020", 30 pgs.
"U.S. Appl. No. 16/212,313, Non Final Office Action dated Feb. 4, 2020", 20 pgs.
"U.S. Appl. No. 16/212,313, Response filed Dec. 2, 2019 to Non Final Office Action dated Aug. 30, 2019", 11 pgs.
"U.S. Appl. No. 16/219,577, Non Final Office Action dated Oct. 29, 2019", 7 pgs.
"U.S. Appl. No. 16/219,577, Response filed Dec. 5, 2019 to Non Final Office Action dated Oct. 29, 2019", 6 pgs.
"U.S. Appl. No. 16/376,598, Notice of Allowability dated Jan. 23, 2020", 2 pgs.
"U.S. Appl. No. 16/511,834, Corrected Notice of Allowability dated Jan. 27, 2020", 2 pgs.
"U.S. Appl. No. 16/541,919, Non Final Office Action dated Apr. 14, 2020", 18 pgs.
"U.S. Appl. No. 16/662,956, Preliminary Amendment filed Oct. 24, 2019", 8 pgs.
"U.S. Appl. No. 16/667,814, Preliminary Amendment filed Apr. 20, 2020", 6 pgs.

(56) References Cited

OTHER PUBLICATIONS

"U.S. Appl. No. 16/709,092, Notice of Allowance dated Apr. 9, 2020", 9 pgs.
"Canadian Application Serial No. 3,027,981, Office Action dated Dec. 5, 2019", 4 pgs.
"Canadian Application Serial No. 3,027,981, Response filed Mar. 31, 2020 to Office Action dated Dec. 5, 2019", 12 pgs.
"European Application Serial No. 15782165.3, Decision to Refuse a European Patent Application dated Mar. 19, 2020", 23 pgs.
"European Application Serial No. 15782165.3, Response filed Jan. 10, 2020 to Summons to Attend Oral Proceedings mailed Sep. 18, 2019", 18 pgs.
"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
Rossignol, Joe, "How to screenshot Snapchat without sending notification", [Online] Retrieved from the Internet: <URL: https://www.idownloadblog.com/author/joerossignol/>, (May 3, 2014), 16 pgs.
U.S. Appl. No. 17/035,575, filed Sep. 28, 2020, Geo-Fence Authorization Provisioning.
U.S. Appl. No. 16/933,205, filed Jul. 20, 2020, Ephemeral Message Collection UI Indicia.
U.S. Appl. No. 16/933,279, filed Jul. 20, 2020, Display Duration Assignment for Ephemeral Messages.
U.S. Appl. No. 16/933,366, filed Jul. 20, 2020, Automated Management of Ephemeral Message Collections.
U.S. Appl. No. 17/023,175, filed Sep. 16, 2020, Routing Messages by Message Parameter.
U.S. Appl. No. 16/911,854, filed Jun. 25, 2020, Prioritization of Messages Within a Message Collection.
"U.S. Appl. No. 15/224,343, Notice of Allowance dated Jul. 29, 2020", 7 pgs.
"U.S. Appl. No. 15/224,343, Response filed Jun. 3, 2020 to Final Office Action dated Apr. 7, 2020", 12 pgs.
"U.S. Appl. No. 15/224,355, Final Office Action dated May 1, 2020", 15 pgs.
"U.S. Appl. No. 15/224,355, Response filed Apr. 22, 2020 to Non Final Office Action dated Jan. 22, 2020", 13 pgs.
"U.S. Appl. No. 15/224,355, Response filed Sep. 1, 2020 to Final Office Action dated May 1, 2020", 16 pgs.
"U.S. Appl. No. 15/224,359, Final Office Action dated May 1, 2020", 13 pgs.
"U.S. Appl. No. 15/224,359, Response filed Sep. 1, 2020 to Final Office Action dated May 1, 2020", 13 pgs.
"U.S. Appl. No. 15/224,365, Final Office Action dated Jul. 2, 2020", 11 pgs.
"U.S. Appl. No. 15/224,365, Response filed Jun. 15, 2020 to Non Final Office Action dated Mar. 13, 2020", 12 pgs.
"U.S. Appl. No. 15/224,372, Final Office Action dated May 4, 2020", 15 pgs.
"U.S. Appl. No. 15/224,377, Final Office Action dated May 5, 2020", 15 pgs.
"U.S. Appl. No. 15/224,377, Response filed Sep. 8, 2020 to Final Office Action dated May 5, 2020", 15 pgs.
"U.S. Appl. No. 15/947,350, Examiner Interview Summary dated Jul. 20, 2020", 4 pgs.
"U.S. Appl. No. 15/947,350, Final Office Action dated May 4, 2020", 12 pgs.
"U.S. Appl. No. 15/947,350, Non Final Office Action dated Sep. 28, 2020", 13 pgs.
"U.S. Appl. No. 15/947,350, Response filed Sep. 4, 2020 to Final Office Action dated May 4, 2020", 12 pgs.
"U.S. Appl. No. 16/000,657, Examiner Interview Summary dated Jun. 12, 2020", 4 pgs.
"U.S. Appl. No. 16/000,657, Examiner Interview Summary dated Sep. 25, 2020", 3 pgs.
"U.S. Appl. No. 16/000,657, Final Office Action dated Jul. 27, 2020", 17 pgs.
"U.S. Appl. No. 16/000,657, Response filed Jul. 6, 2020 to Non Final Office Action dated Mar. 6, 2020", 13 pgs.
"U.S. Appl. No. 16/000,657, Response filed Sep. 28, 2020 to Final Office Action dated Jul. 27, 2020", 12 pgs.
"U.S. Appl. No. 16/212,313, Final Office Action dated Jun. 22, 2020", 20 pgs.
"U.S. Appl. No. 16/212,313, Response filed May 4, 2020 to Non Final Office Action dated Feb. 4, 2020", 12 pgs.
"U.S. Appl. No. 16/529,461, Examiner Interview Summary dated Jul. 31, 2020", 3 pgs.
"U.S. Appl. No. 16/529,461, Non Final Office Action dated May 21, 2020", 19 pgs.
"U.S. Appl. No. 16/529,461, Response filed Jul. 29, 2020 to Non Final Office Action dated May 21, 2020", 11 pgs.
"U.S. Appl. No. 16/541,919, Notice of Allowance dated Jun. 30, 2020", 8 pgs.
"U.S. Appl. No. 16/541,919, Response filed Jun. 12, 2020 to Non Final Office Action dated Apr. 14, 2020", 8 pgs.
"U.S. Appl. No. 16/667,814, Non Final Office Action dated Aug. 17, 2020", 6 pgs.
"U.S. Appl. No. 16/703,526, Corrected Notice of Allowability dated Sep. 2, 2020", 2 pgs.
"U.S. Appl. No. 16/703,526, Notice of Allowance dated Jun. 19, 2020", 10 pgs.
"U.S. Appl. No. 16/703,526, Supplemental Notice of Allowability dated Aug. 10, 2020", 2 pgs.
"U.S. Appl. No. 16/709,092, Corrected Notice of Allowability dated Jun. 1, 2020", 2 ogs.
"U.S. Appl. No. 16/709,092, Corrected Notice of Allowability dated Jul. 22, 2020", 2 pgs.
"Canadian Application Serial No. 2,962,822, Office Action dated Jul. 20, 2020", 5 pgs.
"Chinese Application Serial No. 201580065266.7, Office Action dated Mar. 19, 2020", w/ English translation, 15 pgs.
"Chinese Application Serial No. 201580065266.7, Response filed Jul. 17, 2020 Office Action dated Mar. 19, 2020", w/ English Claims, 11 pgs.
"Korean Application Serial No. 10-2017-7012120, Notice of Preliminary Rejection dated Jun. 17, 2020", w/ English Translation, 8 pgs.
"Korean Application Serial No. 10-2017-7012120, Response filed Sep. 3, 2020 to Notice of (Preliminary Rejection dated Jun. 17, 2020", w/ English Claims, 22 pgs.
U.S. Appl. No. 17/567,397, filed Jan. 3, 2022, Multichannel System.
U.S. Appl. No. 18/162,404, filed Jan. 31, 2023, Geo-Fence Authorization Provisioning.
U.S. Appl. No. 17/647,511, filed Jan. 10, 2022, Routing Messages by Message Parameter.
U.S. Appl. No. 17/323,702, filed May 18, 2021, Ephemeral Gallery of Ephemeral Messages With Opt-In Permanence.
U.S. Appl. No. 17/663,739, filed May 17, 2022, Gallery of Messages From Individuals With a Shared Interest.
U.S. Appl. No. 17/234,012, filed Apr. 19, 2021, Apparatus and Method for Automated Privacy Protection in Distributed Images.
"U.S. Appl. No. 15/224,343, Notice of Allowance dated Nov. 16, 2020", 7 pgs.
"U.S. Appl. No. 15/224,355, 312 Amendment filed Sep. 15, 2022", 8 pgs.
"U.S. Appl. No. 15/224,355, Corrected Notice of Allowability dated Feb. 9, 2022", 3 pgs.

(56) References Cited

OTHER PUBLICATIONS

"U.S. Appl. No. 15/224,355, Corrected Notice of Allowability dated Nov. 18, 2021", 3 pgs.
"U.S. Appl. No. 15/224,355, Notice of Allowability dated Jul. 21, 2021", 13 pgs.
"U.S. Appl. No. 15/224,355, Notice of Allowance dated Jul. 13, 2021", 16 pgs.
"U.S. Appl. No. 15/224,355, Notice of Allowance dated Nov. 3, 2021", 10 pgs.
"U.S. Appl. No. 15/224,355, PTO Response to Rule 312 Communication dated Oct. 28, 2022", 2 pgs.
"U.S. Appl. No. 15/224,359, Notice of Allowance dated Nov. 3, 2020", 15 pgs.
"U.S. Appl. No. 15/224,365, Appeal Brief filed Nov. 10, 2021", 15 pgs.
"U.S. Appl. No. 15/224,365, Appeal Decision dated Mar. 31, 2023", 17 pgs.
"U.S. Appl. No. 15/224,365, Examiner's Answer to Appeal Brief dated Dec. 15, 2021", 2 pgs.
"U.S. Appl. No. 15/224,365, Non Final Office Action dated Dec. 10, 2020", 16 pgs.
"U.S. Appl. No. 15/224,365, Response filed Oct. 2, 2020 to Final Office Action dated Jul. 2, 2020", 13 pgs.
"U.S. Appl. No. 15/224,372, Notice of Allowance dated Jan. 12, 2021", 8 pgs.
"U.S. Appl. No. 15/224,372, Response filed Oct. 5, 2020 to Final Office Action dated May 4, 2020", 17 pgs.
"U.S. Appl. No. 15/224,377, 312 Amendment filed Jan. 7, 2022", 8 pgs.
"U.S. Appl. No. 15/224,377, Corrected Notice of Allowability dated Jan. 18, 2022", 2 pgs.
"U.S. Appl. No. 15/224,377, Corrected Notice of Allowability dated Oct. 26, 2021", 2 pgs.
"U.S. Appl. No. 15/224,377, Final Office Action dated Apr. 14, 2021", 14 pgs.
"U.S. Appl. No. 15/224,377, Non Final Office Action dated Oct. 30, 2020", 15 pgs.
"U.S. Appl. No. 15/224,377, Notice of Allowance dated Oct. 13, 2021", 14 pgs.
"U.S. Appl. No. 15/224,377, PTO Response to Rule 312 Communication dated Jan. 18, 2022", 1 pg.
"U.S. Appl. No. 15/224,377, Response filed Mar. 30, 2021 to Non Final Office Action dated Oct. 30, 2020", 14 pgs.
"U.S. Appl. No. 15/224,377, Response filed Sep. 14, 2021 to Final Office Action dated Apr. 14, 2021", 13 pgs.
"U.S. Appl. No. 15/947,350, Appeal Brief filed Dec. 8, 2021", 23 pgs.
"U.S. Appl. No. 15/947,350, Appeal Decision dated Apr. 5, 2023", 13 pgs.
"U.S. Appl. No. 15/947,350, Examiner's Answer dated Feb. 4, 2022", 8 pgs.
"U.S. Appl. No. 15/947,350, Examiner's Answer dated Feb. 8, 2022", 8 pgs.
"U.S. Appl. No. 15/947,350, Final Office Action dated Apr. 8, 2021", 13 pgs.
"U.S. Appl. No. 15/947,350, Response filed Mar. 1, 2021 to Non Final Office Action dated Sep. 28, 2020", 12 pgs.
"U.S. Appl. No. 16/000,657, 312 Amendment filed Apr. 30, 2021", 8 pgs.
"U.S. Appl. No. 16/000,657, Advisory Action dated Oct. 19, 2020", 3 pgs.
"U.S. Appl. No. 16/000,657, Notice of Allowance dated Feb. 4, 2021", 8 pgs.
"U.S. Appl. No. 16/000,657, PTO Response to Rule 312 Communication dated May 11, 2021", 3 pgs.
"U.S. Appl. No. 16/212,313, Final Office Action dated Feb. 10, 2022", 22 pgs.
"U.S. Appl. No. 16/212,313, Final Office Action dated May 27, 2021", 19 pgs.
"U.S. Appl. No. 16/212,313, Final Office Action dated Sep. 3, 2021", 22 pgs.
"U.S. Appl. No. 16/212,313, Final Office Action dated Nov. 2, 2022", 6 pgs.
"U.S. Appl. No. 16/212,313, Non Final Office Action dated Apr. 10, 2023", 23 pgs.
"U.S. Appl. No. 16/212,313, Non Final Office Action dated Dec. 8, 2020", 18 pgs.
"U.S. Appl. No. 16/212,313, Response filed Feb. 3, 2022 to Final Office Action dated Sep. 3, 2021", 14 pgs.
"U.S. Appl. No. 16/212,313, Response filed Apr. 3, 2023 to Final Office Action dated Nov. 2, 2022", 12 pgs.
"U.S. Appl. No. 16/212,313, Response filed May 10, 2021 to Non Final Office Action dated Dec. 8, 2020", 9 pgs.
"U.S. Appl. No. 16/212,313, Response filed Aug. 27, 2021 to Final Office Action dated May 27, 2021", 13 pgs.
"U.S. Appl. No. 16/212,313, Response filed Oct. 11, 2022 to Non Final Office Action dated Jun. 9, 2022", 10 pgs.
"U.S. Appl. No. 16/529,461, Advisory Action dated Jan. 8, 2021", 4 pgs.
"U.S. Appl. No. 16/529,461, Final Office Action dated Oct. 20, 2020", 24 pgs.
"U.S. Appl. No. 16/529,461, Non Final Office Action dated Feb. 22, 2021", 27 pgs.
"U.S. Appl. No. 16/529,461, Notice of Allowance dated Jun. 23, 2021", 9 pgs.
"U.S. Appl. No. 16/529,461, Notice of Allowance dated Oct. 1, 2021", 8 pgs.
"U.S. Appl. No. 16/529,461, Response filed Apr. 29, 2021 to Non Final Office Action dated Feb. 22, 2021", 12 pgs.
"U.S. Appl. No. 16/529,461, Response filed Dec. 18, 2020 to Final Office Action dated Oct. 20, 2020", 10 pgs.
"U.S. Appl. No. 16/541,919, Notice of Allowance dated Oct. 15, 2020", 8 pgs.
"U.S. Appl. No. 16/662,956, Final Office Action dated Mar. 29, 2021", 17 pgs.
"U.S. Appl. No. 16/662,956, Final Office Action dated Oct. 27, 2021", 15 pgs.
"U.S. Appl. No. 16/662,956, Non Final Office Action dated Jul. 21, 2021", 12 pgs.
"U.S. Appl. No. 16/662,956, Non Final Office Action dated Oct. 6, 2020", 13 pgs.
"U.S. Appl. No. 16/662,956, Response filed Jan. 25, 2022 to Final Office Action dated Oct. 27, 2021", 12 pgs.
"U.S. Appl. No. 16/662,956, Response filed Jun. 24, 2021 to Final Office Action dated Mar. 29, 2021", 10 pgs.
"U.S. Appl. No. 16/662,956, Response filed Oct. 5, 2021 to Non Final Office Action dated Jul. 21, 2021", 10 pgs.
"U.S. Appl. No. 16/662,956, Response filed Dec. 2, 2020 to Non Final Office Action dated Oct. 6, 2020", 11 pgs.
"U.S. Appl. No. 16/667,814, Corrected Notice of Allowability dated Mar. 2, 2021", 2 pgs.
"U.S. Appl. No. 16/667,814, Corrected Notice of Allowability dated Dec. 23, 2020", 2 pgs.
"U.S. Appl. No. 16/667,814, Notice of Allowance dated Nov. 23, 2020", 8 pgs.
"U.S. Appl. No. 16/667,814, Response filed Oct. 29, 2020 to Non Final Office Action dated Aug. 17, 2020", 7 pgs.
"U.S. Appl. No. 16/841,817, Corrected Notice of Allowability dated Sep. 16, 2021", 2 pgs.
"U.S. Appl. No. 16/841,817, Corrected Notice of Allowability dated Dec. 30, 2021", 2 pgs.
"U.S. Appl. No. 16/841,817, Non Final Office Action dated May 26, 2021", 7 pgs.
"U.S. Appl. No. 16/841,817, Notice of Allowance dated Sep. 3, 2021", 7 pgs.
"U.S. Appl. No. 16/841,817, Notice of Allowance dated Dec. 16, 2021", 8 pgs.
"U.S. Appl. No. 16/841,817, Response filed Aug. 26, 2021 to Non Final Office Action dated May 26, 2021", 6 pgs.
"U.S. Appl. No. 16/911,854, Corrected Notice of Allowability dated Sep. 16, 2021", 2 pgs.

(56) References Cited

OTHER PUBLICATIONS

"U.S. Appl. No. 16/911,854, Corrected Notice of Allowability dated Oct. 6, 2021", 2 pgs.
"U.S. Appl. No. 16/911,854, Non Final Office Action dated Mar. 3, 2021", 12 pgs.
"U.S. Appl. No. 16/911,854, Notice of Allowance dated Jun. 17, 2021", 8 pgs.
"U.S. Appl. No. 16/911,854, Response filed May 28, 2021 to Non Final Office Action dated Mar. 3, 2021", 8 pgs.
"U.S. Appl. No. 16/933,205, Final Office Action dated Jan. 18, 2023", 21 pgs.
"U.S. Appl. No. 16/933,205, Final Office Action dated Nov. 29, 2021", 21 pgs.
"U.S. Appl. No. 16/933,205, Non Final Office Action dated Apr. 16, 2021", 39 pgs.
"U.S. Appl. No. 16/933,205, Non Final Office Action dated May 25, 2023", 20 pgs.
"U.S. Appl. No. 16/933,205, Response filed Feb. 23, 2023 to Final Office Action dated Jan. 18, 2023", 13 pgs.
"U.S. Appl. No. 16/933,205, Response filed Oct. 18, 2021 to Non Final Office Action dated Apr. 16, 2021", 13 pgs.
"U.S. Appl. No. 16/933,279, Non Final Office Action dated Mar. 25, 2021", 41 pgs.
"U.S. Appl. No. 16/933,279, Response filed Aug. 25, 2021 to Non Final Office Action dated Mar. 25, 2021", 14 pgs.
"U.S. Appl. No. 16/933,366, Decision on Pre-Appeal Brief Request dated Apr. 14, 2023", 2 pgs.
"U.S. Appl. No. 16/933,366, Final Office Action dated Oct. 21, 2021", 19 pgs.
"U.S. Appl. No. 16/933,366, Final Office Action dated Dec. 29, 2022", 21 pgs.
"U.S. Appl. No. 16/933,366, Non Final Office Action dated Apr. 27, 2021", 39 pgs.
"U.S. Appl. No. 16/933,366, Non Final Office Action dated May 18, 2023", 21 pgs.
"U.S. Appl. No. 16/933,366, Pre-Appeal Brief Request filed Mar. 29, 2023", 4 pgs.
"U.S. Appl. No. 16/933,366, Response filed Aug. 27, 2021 to Non Final Office Action dated Apr. 27, 2021", 16 pgs.
"U.S. Appl. No. 16/933,366, Response filed Nov. 23, 2022 to Non Final Office Action dated Jul. 25, 2022", 12 pgs.
"U.S. Appl. No. 17/023,175, Non Final Office Action dated Jun. 8, 2021", 8 pgs.
"U.S. Appl. No. 17/023,175, Notice of Allowance dated Oct. 5, 2021", 7 pgs.
"U.S. Appl. No. 17/023,175, Response filed Sep. 8, 2021 to Non Final Office Action dated Jun. 8, 2021", 6 pgs.
"U.S. Appl. No. 17/023,175, Supplemental Notice of Allowability dated Jan. 20, 2022", 2 pgs.
"U.S. Appl. No. 17/035,575, Corrected Notice of Allowability dated Mar. 8, 2023", 4 pgs.
"U.S. Appl. No. 17/035,575, Notice of Allowance dated Oct. 17, 2022", 8 pgs.
"U.S. Appl. No. 17/035,575, Response filed Aug. 25, 2022 to Non Final Office Action dated May 26, 2022", 12 pgs.
"U.S. Appl. No. 17/234,012, Final Office Action dated May 24, 2023", 13 pgs.
"U.S. Appl. No. 17/234,012, Non Final Office Action dated Feb. 8, 2023", 15 pgs.
"U.S. Appl. No. 17/234,012, Preliminary Amendment filed Sep. 28, 2022", 6 pgs.
"U.S. Appl. No. 17/234,012, Response filed May 8, 2023 to Non Final Office Action dated Feb. 8, 2023", 8 pgs.
"U.S. Appl. No. 17/323,702, Final Office Action dated Mar. 10, 2023", 17 pgs.
"U.S. Appl. No. 17/323,702, Non Final Office Action dated Sep. 21, 2022", 36 pgs.
"U.S. Appl. No. 17/323,702, Response filed Jan. 23, 2023 to Non Final Office Action dated Sep. 21, 2022", 14 pgs.

"U.S. Appl. No. 17/567,397, Non Final Office Action dated Jan. 30, 2023", 33 pgs.
"U.S. Appl. No. 17/567,397, Non Final Office Action dated Aug. 22, 2022", 32 pgs.
"U.S. Appl. No. 17/567,397, Response filed Apr. 27, 2023 to Non Final Office Action dated Jan. 30, 2023", 10 pgs.
"U.S. Appl. No. 17/567,397, Response filed Nov. 9, 2022 to Non Final Office Action dated Aug. 22, 2022", 10 pgs.
"U.S. Appl. No. 17/647,511, Final Office Action dated Dec. 8, 2022", 17 pgs.
"U.S. Appl. No. 17/647,511, Non Final Office Action dated Sep. 22, 2022", 12 pgs.
"U.S. Appl. No. 17/647,511, Notice of Allowance dated May 25, 2023", 6 pgs.
"U.S. Appl. No. 17/647,511, Response filed Oct. 28, 2022 to Non Final Office Action dated Sep. 22, 2022", 8 pgs.
"U.S. Appl. No. 17/647,511, Response filed Dec. 15, 2022 to Final Office Action dated Dec. 8, 2022", 12 pgs.
"U.S. Appl. No. 17/663,739, Non Final Office Action dated Feb. 15, 2023", 17 pgs.
"U.S. Appl. No. 17/663,739, Response filed May 5, 2023 to Non Final Office Action dated Feb. 15, 2023", 9 pgs.
"U.S. Appl. No. 17/683,725, Non Final Office Action dated Aug. 26, 2022", 19 pgs.
"U.S. Appl. No. 18/162,404, Non Final Office Action dated Jun. 5, 2023", 29 pgs.
"Canadian Application Serial No. 2,962,822, Examiner's Rule 86(2) Report dated Dec. 30, 2022", 4 pgs.
"Canadian Application Serial No. 2,962,822, Office Action dated Feb. 18, 2021", 6 pgs.
"Canadian Application Serial No. 2,962,822, Office Action dated Jul. 22, 2021", 4 pgs.
"Canadian Application Serial No. 2,962,822, Office Action dated Dec. 23, 2021", 4 pgs.
"Canadian Application Serial No. 2,962,822, Response filed Jan. 14, 2021 to Office Action dated Jul. 20, 2020", 3 pgs.
"Canadian Application Serial No. 2,962,822, Response filed Jun. 16, 2021 to Office Action dated Feb. 18, 2021", 11 pgs.
"Canadian Application Serial No. 2,962,822, Voluntary Amendment Filed Oct. 13, 2022", 21 pgs.
"Canadian Application Serial No. 3,027,981, Office Action dated Oct. 2, 2020", 5 pgs.
"Canadian Application Serial No. 3,027,981, Response filed Feb. 2, 2021 to Office Action dated Oct. 2, 2020", 15 pgs.
"European Application Serial No. 15870874.3, Communication Pursuant to Article 94(3) EPC dated Feb. 22, 2021", 5 pgs.
"Korean Application Serial No. 10-2017-7012120, Notice of Preliminary Rejection dated Dec. 8, 2020", w/ English Translation, 5 pgs.
"Korean Application Serial No. 10-2017-7012120, Response filed Feb. 8, 2021 to Notice of Preliminary Rejection dated Dec. 8, 2020", w/ English Claims, 18 pgs.
"Korean Application Serial No. 10-2021-7028720, Notice of Preliminary Rejection dated Nov. 12, 2021", w/ English Translation, 10 pgs.
"Korean Application Serial No. 10-2021-7028720, Response filed Aug. 17, 2022 to Notice of Preliminary Rejection dated Jun. 29, 2022", w/ English Claims, 18 pgs.
"Korean Application Serial No. 10-2022-7042399, Notice of Preliminary Rejection dated May 23, 2023", w/ English translation, 9 pgs.
"Canadian Application Serial No. 3,158,965, Examiners Rule 86(2) Report dated Jun. 5, 2023", 6 pgs.
"U.S. Appl. No. 17/663,739, Notice of Allowance dated Jun. 22, 2023", 7 pgs.
"U.S. Appl. No. 17/567,397, Final Office Action dated Jul. 3, 2023", 35 pgs.
"U.S. Appl. No. 15/947,350, Notice of Allowance dated Jul. 7, 2023", 8 pgs.
"Chinese Application Serial No. 202110010215.1, Office Action dated Apr. 22, 2023", w/ English Translation, 13 pgs.
"U.S. Appl. No. 17/663,739, Supplemental Notice of Allowability dated Jul. 12, 2023", 4 pgs.

(56) References Cited

OTHER PUBLICATIONS

"Canadian Application Serial No. 2,962,822, Office Action dated Jul. 28, 2023", 4 pgs.
"U.S. Appl. No. 16/933,279, Final Office Action dated Jul. 31, 2023", 17 pgs.
"U.S. Appl. No. 15/224,365, Non Final Office Action dated Sep. 15, 2023", 17 pgs.
"U.S. Appl. No. 16/212,313, Final Office Action dated Oct. 4, 2023", 23 pgs.
"U.S. Appl. No. 16/212,313, Response filed Sep. 11, 2023 to Non Final Office Action dated Apr. 10, 2023", 12 pgs.
"U.S. Appl. No. 16/933,205, Response filed Oct. 25, 2023 to Non Final Office Action dated May 25, 2023", 13 pgs.
"U.S. Appl. No. 16/933,279, Response filed Oct. 26, 2023 to Final Office Action dated Jul. 31, 2023", 12 pgs.
"U.S. Appl. No. 16/933,366, Final Office Action dated Oct. 13, 2023", 24 pgs.
"U.S. Appl. No. 16/933,366, Response filed Sep. 18, 2023 to Non Final Office Action dated May 18, 2023", 15 pgs.
"U.S. Appl. No. 17/234,012, Non Final Office Action dated Aug. 24, 2023", 14 pgs.
"U.S. Appl. No. 17/234,012, Response filed Aug. 17, 2023 to Final Office Action dated May 24, 2023", 8 pgs.
"U.S. Appl. No. 17/323,702, Response filed Aug. 10, 2023 to Final Office Action dated Mar. 10, 2023", 13 pgs.
"U.S. Appl. No. 17/567,397, Response filed Aug. 30, 2023 to Final Office Action dated Jul. 3, 2023", 12 pgs.
"U.S. Appl. No. 17/647,511, Supplemental Notice of Allowability dated Sep. 7, 2023", 3 pgs.
"U.S. Appl. No. 18/162,404, Notice of Allowance dated Oct. 2, 2023", 11 pgs.
"U.S. Appl. No. 18/162,404, Response filed Aug. 22, 2023 to Non Final Office Action dated Jun. 5, 2023", 11 pgs.
"U.S. Appl. No. 18/464,013, Preliminary Amendment filed Sep. 8, 2023", (3 pgs).

\* cited by examiner

| 700 | 702 | 704 |
|---|---|---|
| Message_1 | 10 Seconds | 120 Minutes Left |
| Message_2 | 5 Seconds | 360 Minutes Left |
| Message_3 | 5 Seconds | 1200 Minutes Left |
| Message_4 | 10 Seconds | 1320 Minutes Left |

FIG. 7

GALLERY OF EPHEMERAL MESSAGES

CLAIM OF PRIORITY

This application is a continuation and claims the benefit of priority of U.S. patent application Ser. No. 14/505,478, filed Oct. 2, 2014, which is hereby incorporated by reference herein in its entirety.

FIELD OF THE INVENTION

This invention relates generally to the display of computer network delivered ephemeral messages. More particularly, this invention relates to an ephemeral gallery of ephemeral messages.

BACKGROUND OF THE INVENTION

Messages (e.g., text, photo or video) delivered over computer networks are well known. However, one problem associated with such messages is that they require an affirmative act on the part of a user to delete or remove messages from their devices once the messages have been viewed or read. As a result, in some instances, users refrain from spontaneously sending many messages for fear of filling or cluttering a recipient's in-box.

In view of the foregoing, it would be desirable to maintain spontaneity and expand communicative content of messaging activity, while reducing the device management burdens imposed upon a message recipient.

SUMMARY OF THE INVENTION

A server has a processor and a memory storing instructions executed by the processor to maintain an ephemeral gallery of ephemeral messages. An ephemeral message is posted to the ephemeral gallery. The ephemeral message has an associated message duration parameter and a gallery participation parameter. An ephemeral message is removed from the ephemeral gallery in response to the identification of an expired gallery participation parameter.

BRIEF DESCRIPTION OF THE FIGURES

The invention is more fully appreciated in connection with the following detailed description taken in conjunction with the accompanying drawings, in which:

FIG. 7 illustrates an ephemeral gallery data structure associated with an embodiment of the invention.

Like reference numerals refer to corresponding parts throughout the several views of the drawings.

DETAILED DESCRIPTION OF THE INVENTION

Figure 1:
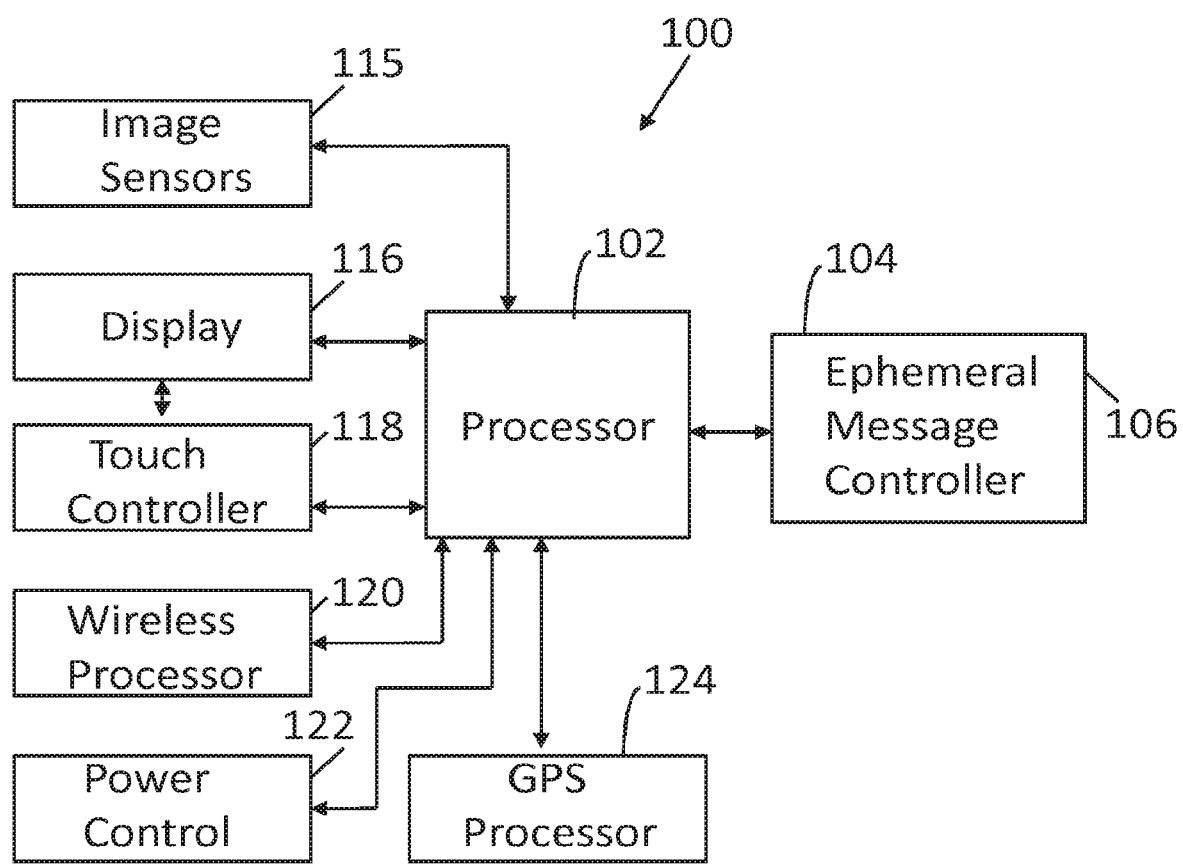
FIG. 1 illustrates components of an electronic device utilized in accordance with the invention.

FIG. 1 illustrates an electronic device 100. In one embodiment, the electronic device 100 is a smartphone with a processor 102 in communication with a memory 104. The processor 102 may be a central processing unit and/or a graphics processing unit. The memory 104 is a combination of flash memory and random access memory. The memory 104 stores an ephemeral message controller 106 to implement operations of the invention. The ephemeral message controller 106 may include executable instructions to access a server which coordinates operations disclosed herein. Alternately, the ephemeral message controller 106 may include executable instructions to coordinate some of the operations disclosed herein, while the server implements other operations.

An ephemeral message may be a text, an image, a video and the like. The display time for the ephemeral message is typically set by the message sender. However, the display time may be a default setting or a setting specified by the recipient. Regardless of the setting technique, the message is transitory (i.e., the message is deleted or otherwise made inaccessible after a certain period of time or after a certain action has been taken).

The processor 102 is also coupled to image sensors 115. The image sensors 115 may be known digital image sensors, such as charge coupled devices. The image sensors capture visual media, which is presented on display 116.

A touch controller 118 is connected to the display 116 and the processor 102. The touch controller 118 is responsive to haptic signals applied to the display 116. In one embodiment, the ephemeral message controller 106 monitors signals from the touch controller 118. If haptic contact is observed by the touch controller 118 in connection with indicia of an ephemeral gallery, then the ephemeral gallery is displayed to the user as a sequence of ephemeral messages.

The electronic device 100 may also include other components commonly associated with a smartphone, such as a wireless signal processor 120 to provide connectivity to a wireless network. A power control circuit 122 and a global positioning system processor 124 may also be utilized. While many of the components of FIG. 1 are known in the art, new functionality is achieved through the ephemeral message controller 106 operating in conjunction with a server.

Figure 2:
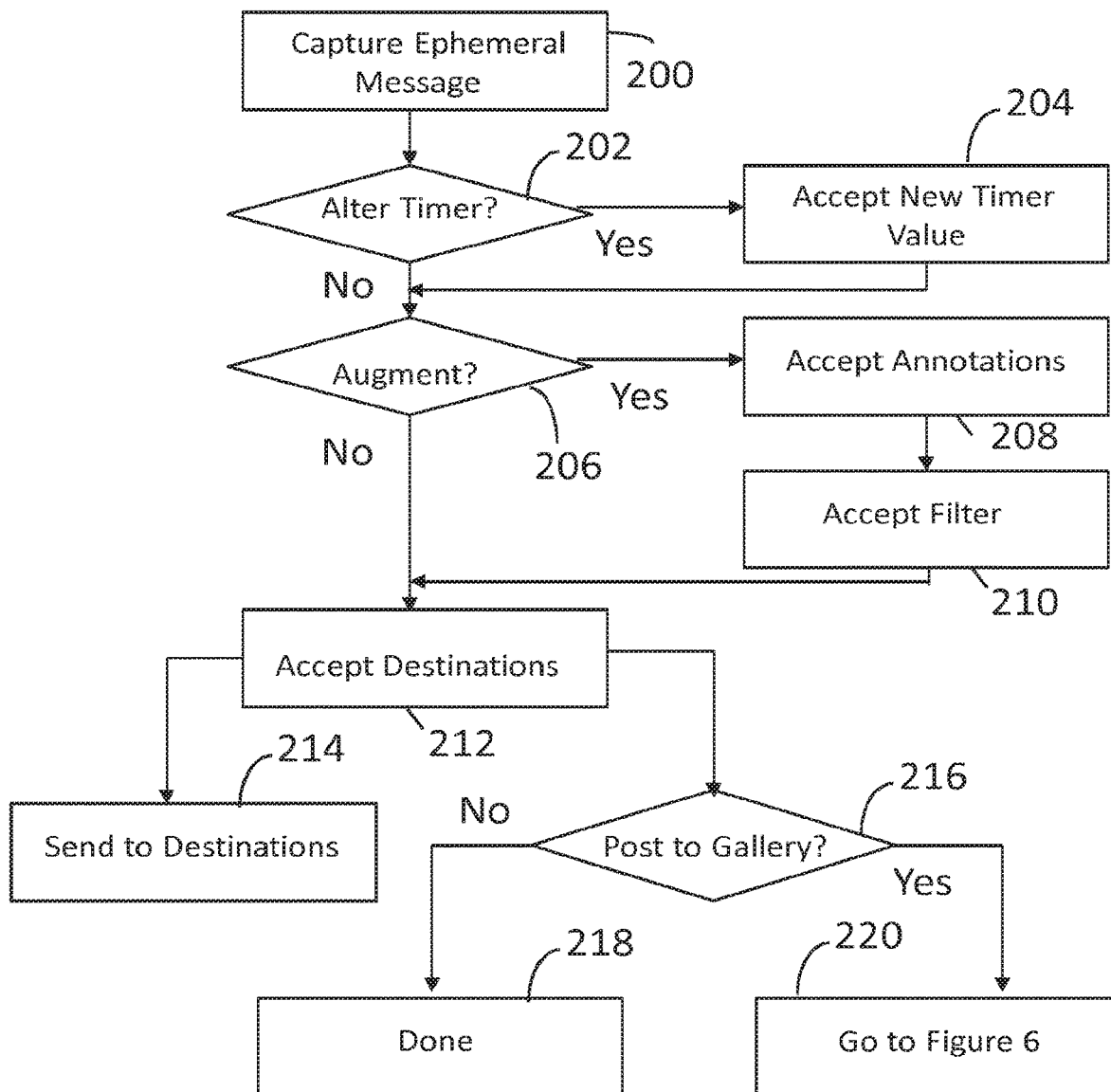
FIG. 2 illustrates processing operations associated with an embodiment of the invention.
Figure 3:
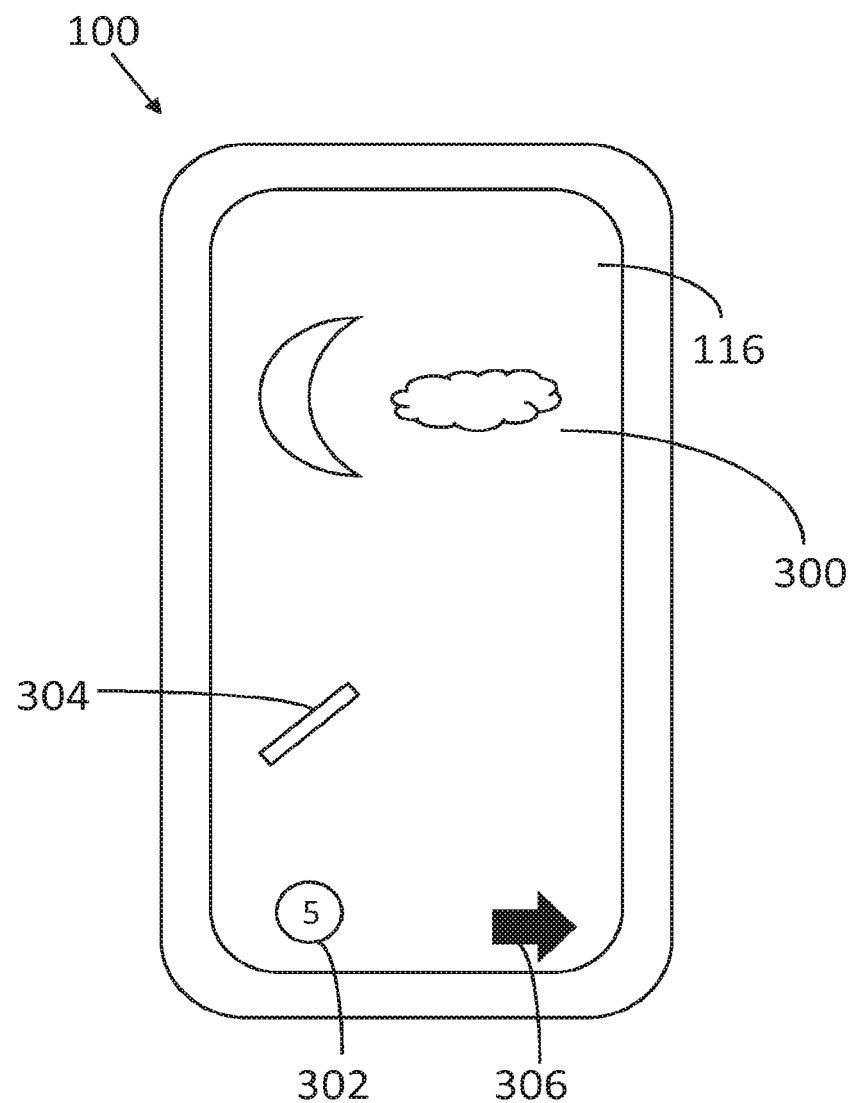
FIG. 3 illustrates an electronic device for capturing and augmenting an ephemeral message.

FIG. 2 illustrates processing operations associated with the ephemeral message controller 106. Initially, an ephemeral message is captured 200. FIG. 3 illustrates electronic device 100 and touch display 116 with a photograph 300 operative as an ephemeral message.

The next processing operation of FIG. 2 is to determine whether to alter a timer or a message duration parameter 202. FIG. 3 illustrates an example of indicia 302 of a message duration parameter. In this example, the indicia indicates a default of 5 seconds as the message duration parameter. If the indicia is engaged (e.g., through haptic contact), then a prompt may be supplied for a new message duration parameter (e.g., 10 seconds). Such activity (202—Yes) results in the acceptance of the new timer value 204. If a new timer value is specified or no alteration of a timer transpires (202—No) control proceeds to block 206. The user may be prompted to augment the ephemeral message. As shown in FIG. 3, a drawing tool 304 may be supplied to allow a user to add a hand drawn message. The drawing tool 304 may be manipulated by haptic contact to enter a message or annotation of visual media. Alternately or in addition, a keyboard may be used to type augment a message. For example, a tap on the touch display 116 may result in a keyboard being displayed, which allows a user to enter a typed message.

As shown in FIG. 2, annotations may be accepted 208 in this manner. Augmentation may also be in the form of photograph filters. That is, photograph filters may be accepted 210. For example, a first right-to-left swipe motion on the touch display 116 may drag a first filter on top of the photograph. A second right-to-left swipe motion on the touch display 116 may drag a second filter on top of the photograph. Filter processing of this type is described in commonly owned U.S. Ser. No. 14/325,270, filed Jul. 7, 2014, the contents of which are incorporated herein by reference.

Figure 4:
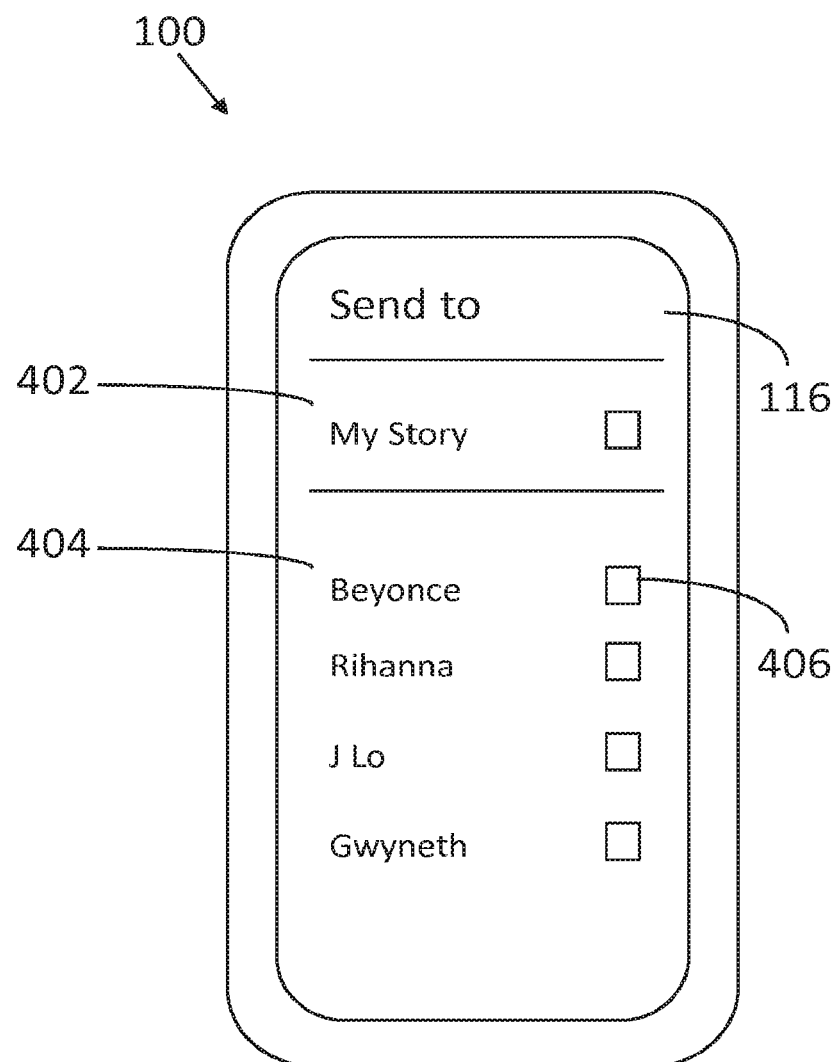
FIG. 4 illustrates an ephemeral message destination routing interface that may be used in accordance with an embodiment of the invention.

The next operation of FIG. 2 is to accept destinations 212. As more fully described below, a destination may be used to identify intended recipients of a message or a location or "gallery" where one or more messages may be accessed. FIG. 3 illustrates an icon 306 to invoke a destination list. Haptic contact on the icon may result in a destination list of the type shown in FIG. 4. FIG. 4 illustrates an electronic device 100 displaying a destination list. The destination list may include a destination of "My Story" 402, where "My Story" is a reference to an ephemeral gallery of ephemeral messages. The destination list may also include a friends or contacts section 404 listing various friends that may be ephemeral message recipients. Haptic contact with a box 406 associated with a listed individual or story places the corresponding individual or story on a destination list.

Figure 6:
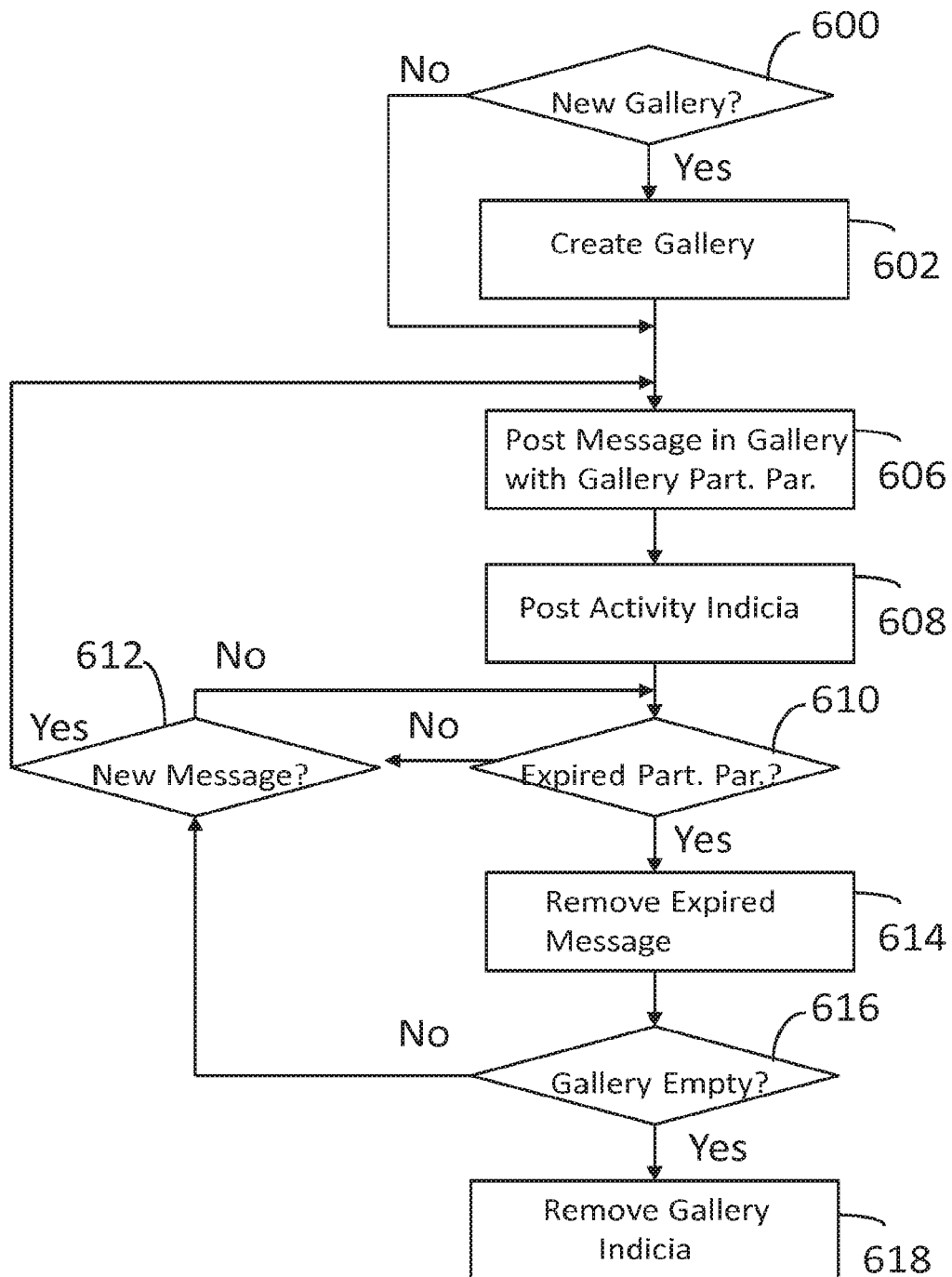
FIG. 6 illustrates ephemeral gallery processing operations associated with an embodiment of the invention.

Returning to FIG. 2, after the destination list is specified, the ephemeral message is sent to the specified destinations 214. For example, the ephemeral message is sent to friends selected from section 404, if any. A check is also made to determine whether the message should be posted to an ephemeral gallery 216. If not (216—No), processing is completed. If so (216—Yes), the processing of FIG. 6 is performed 220. Thus, it is possible to send a message to one or more friends and/or post to an ephemeral gallery.

Figure 5:
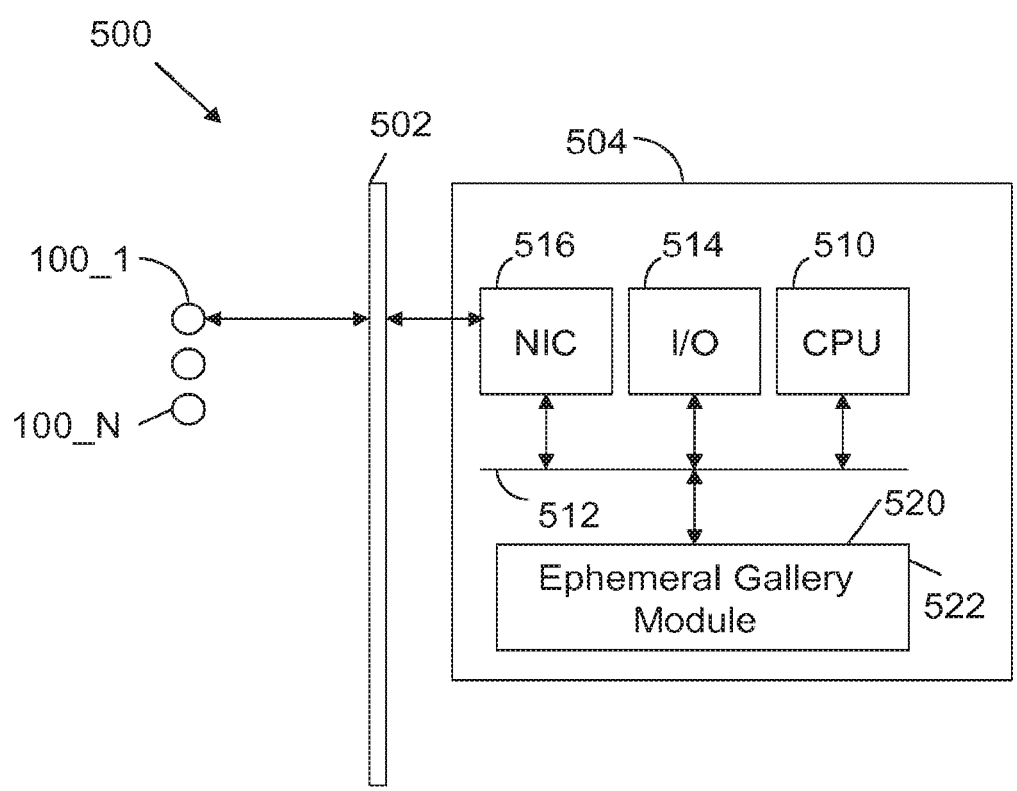
FIG. 5 illustrates a system to implement an embodiment of the invention.

FIG. 5 illustrates a system 500. The figure presents a simplified representation of a set of electronic devices 100_1 through 100_N, where each electronic device may be configured as the device of FIG. 1. Each electronic device is in communication with a network 502, which may be any combination of wireless and wired networks.

A server 504 is also connected to the network 502. The server 504 includes standard components, such as a central processing unit 510 connected to input/output devices 514 via a network 512. The input/output devices 514 may include a keyboard, mouse, display and the like. A network interface circuit 516 is also connected to the bus 512 to provide connectivity to network 502. A memory 520 is also connected to the bus 512. The memory 520 stores an ephemeral gallery module 522. The ephemeral gallery module 522 stores instructions executed by the central processing unit 510 to implement operations of the invention. For example, the ephemeral gallery module 522 may include instructions to coordinate the processing operations of FIG. 2. These operations may be controlled by the ephemeral gallery module 522 or they may be performed in conjunction with selective operations performed by the ephemeral message controller 106.

FIG. 6 illustrates ephemeral gallery module 522 operations performed in accordance with an embodiment of the invention. The first operation of FIG. 6 is to determine whether a new gallery is needed 600. As discussed in connection with FIG. 4, designating "My Story" 402 as a message recipient results in a post of an ephemeral message to an ephemeral gallery. If a gallery does not exist (600—Yes), then a new gallery is created 602. Alternately, if a gallery does exist and a user wants to create a new gallery, then the new gallery is created 602. The user may be supplied a prompt to indicate whether an existing gallery should be used or a new gallery should be designated.

The message is then posted in the gallery with a gallery participation parameter 606. The gallery participation parameter is an ephemeral period of time that the ephemeral message will continue to exist in the gallery. For example, a first ephemeral message posted to the gallery may have a default gallery participation parameter of 24 hours. In other instances, the gallery participation parameter may be set by a user. The gallery participation parameter value decreases with the passage of time. Thus, in this embodiment, an ephemeral message gallery subsists for as long as the gallery participation parameter of the last message posed to the gallery.

In another embodiment, a gallery timer may be assigned to a gallery by a user. The gallery timer may be used to establish a lifespan of an associated gallery and messages posted to this gallery subsist for no longer than the life of the gallery. Thus, in some embodiments, all messages posted to such a gallery will subsist for the duration of the life of the gallery (regardless of posting time). In other embodiments, messages may be submitted with a gallery participation parameter. In these embodiments, messages expire and become inaccessible at the earlier of the gallery participation parameter or the remaining life of the gallery.

The next processing operation of FIG. 6 is to post activity indicia 608. Examples of activity indicia are provided below. A check is then made to determine whether there is an expired participation parameter 610. If so (610—Yes), the ephemeral message associated with the expired participation parameter is removed from the ephemeral gallery 614. If as a result of this removed message the gallery is empty (616—Yes), then the ephemeral gallery terminates and indicia of the gallery is removed 618. If the gallery is not empty (616—No), a check is made for a new message 612. If a new message exists (612 -Yes), then processing returns to block 604. If a new message does not exist (612—No), then processing returns to block 610. If an expired participation parameter does not exist (610 -No), then a check is made once again for a new message 612.

FIG. 7 illustrates a data structure for an ephemeral message gallery. A first column 700 may have a list of messages. Another column 702 may have a list of message duration parameters for individual messages. Another column 704 may have a list of gallery participation parameters for individual messages. Observe in this example that the values in column 702 add up to 30 seconds. Thus, the ephemeral message gallery in this example has four messages that will take 30 seconds to display. Further observe that the oldest message (Message_1) is displayed first and will be removed in 120 minutes. In this example, the newest message (Message_4) will remain in the ephemeral gallery for 1320 minutes at which point the ephemeral gallery will expire, unless another message is posted. The arrival of a new message alters the gallery timer, but does not alter gallery participation parameters.

Figure 8:
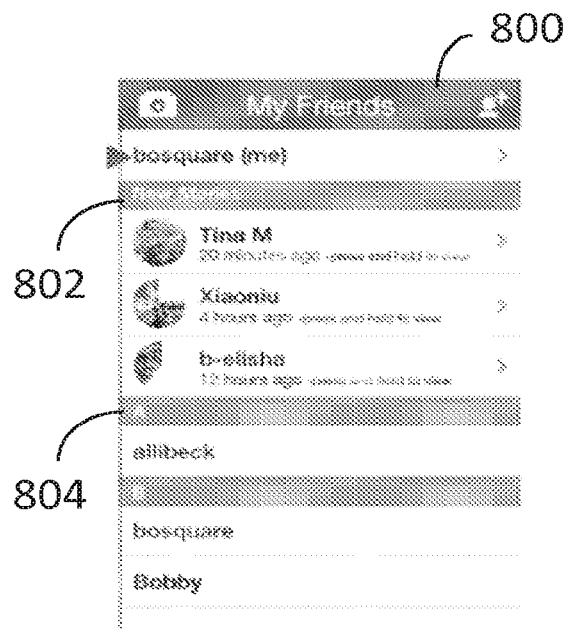
FIG. 8 illustrates ephemeral gallery indicia associated with an embodiment of the invention.

FIG. 8 illustrates an interface 800 with a section 802 that designates available ephemeral message galleries (stories) and a section 804 with a listing of friends (available destinations for an ephemeral message). Observe that section 802 has indicia of ephemeral message gallery activity. FIG. 8 provides example indicia of the time that the last message was posted to the ephemeral message gallery. FIG. 8 also provides example graphical indicia of the amount of time remaining for an ephemeral message gallery. Observe that the first entry was posted 20 minutes ago and therefore has a full circle indicative of the time remaining for that ephemeral message gallery. On the other hand, the third entry was posted 12 hours ago and has approximately half a circle to indicate the time remaining for that ephemeral message gallery. This example contemplates a 24 hour period for an ephemeral message gallery. Naturally, other time periods may be utilized in accordance with embodiments of the invention.

Figure 9:
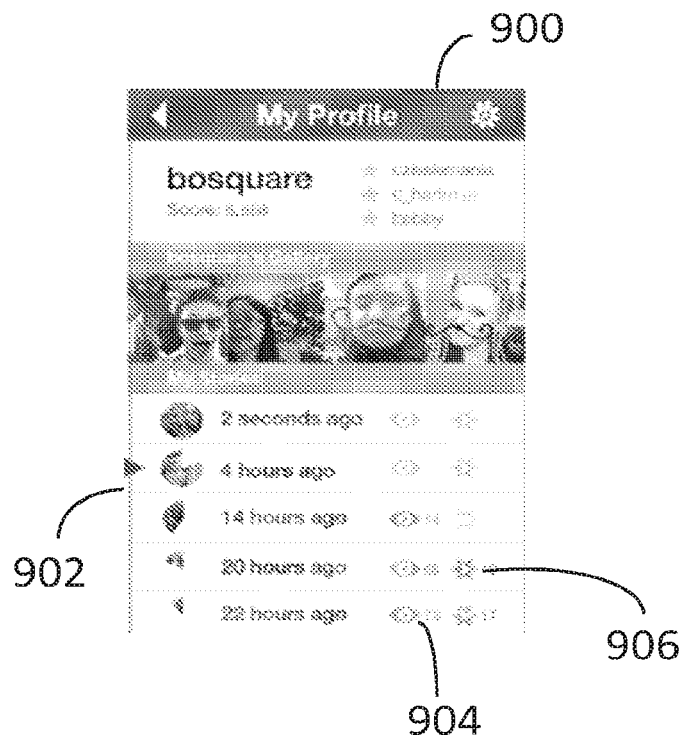
FIG. 9 illustrates ephemeral gallery indicia associated with another embodiment of the invention.

FIG. 9 illustrates an interface 900 with information on a user's stories. Individual stories 902 have indicia of the amount of time remaining. Indicia 904 of the number of ephemeral gallery views is also provided. Indicia 906 of screenshots taken of an ephemeral message is also provided. This information is significant since the intent of the message was that it be ephemeral. If a message recipient overrides this intent by taking a screen shot, then the message sender is advised.

Figure 10:
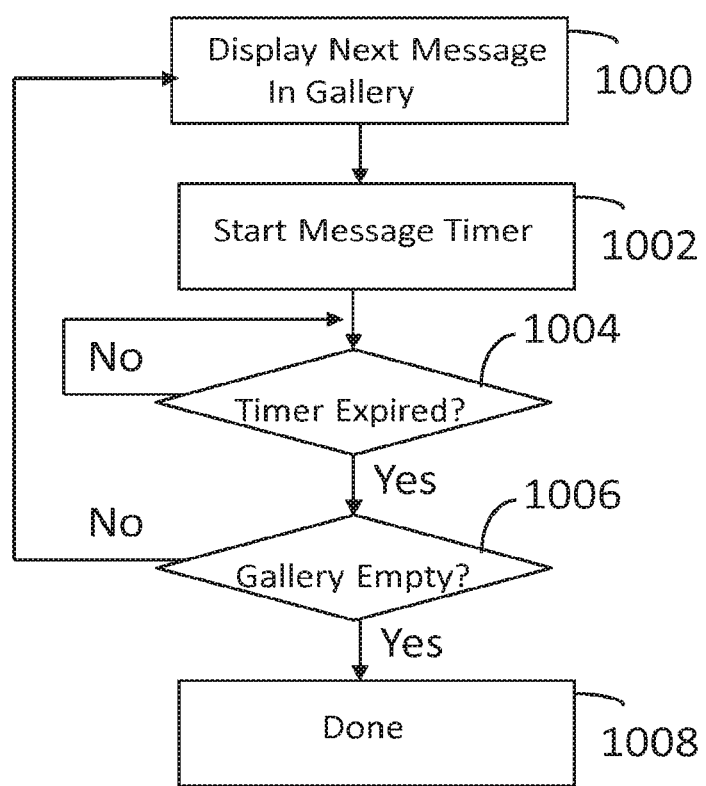
FIG. 10 illustrates operations performed in response to an ephemeral gallery view request.

FIG. 10 illustrates processing operations performed by the ephemeral gallery module 522 in response to a request for an ephemeral message gallery. As shown in FIG. 8, a user receives a list of 802 of available stories. Haptic contact with indicia of a story is operative as a request to view an ephemeral message gallery.

The first operation in FIG. 10 is to display the next message in the gallery 1000. In the example of FIG. 7, the oldest message is the first message to be displayed. A message timer is then started 1002. The message timer expires at the end of the message duration parameter for the displayed ephemeral message. In the example of FIG. 7, the first message (Message_1) is displayed for 10 seconds. Block 1004 checks for the timer to expire. Upon expiration of the timer (1004—Yes), a check is made to determine if the gallery is empty 1006. If so (1006—Yes), processing is completed 1008. If not (1006—No), processing returns to block 1000. This processing loop is repeated until the gallery is empty.

Figure 11:
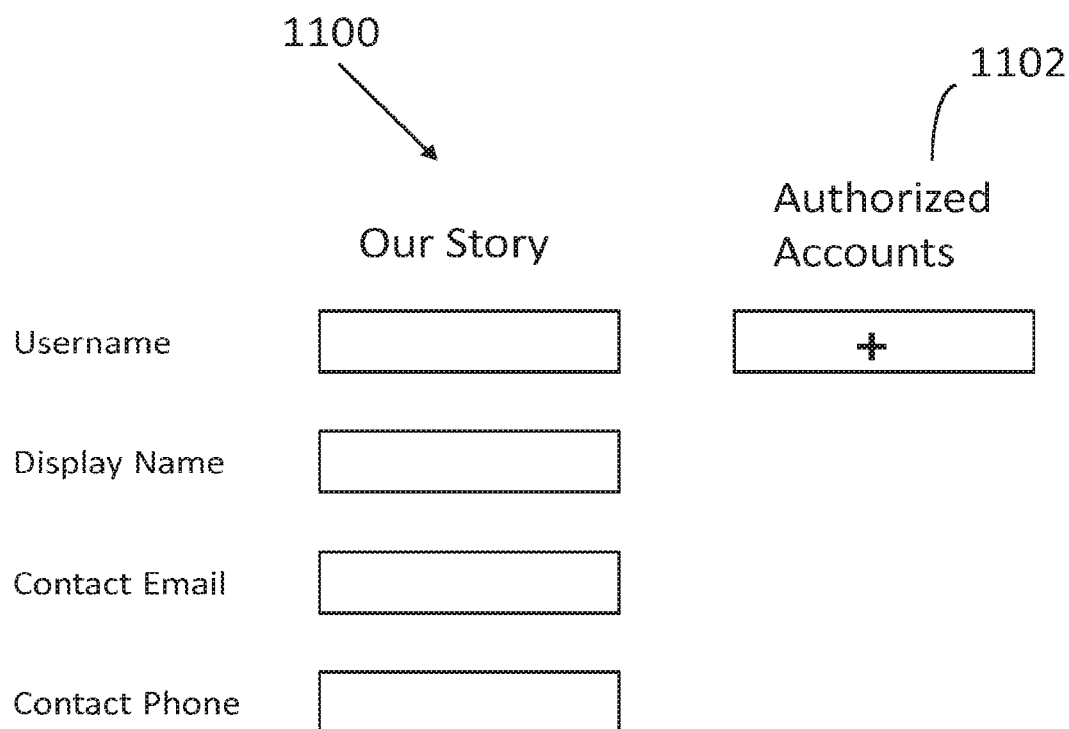
FIG. 11 illustrates an account administration interface to establish an ephemeral gallery that receives ephemeral messages from multiple users.

FIG. 11 illustrates an account administration interface 1100 to establish an ephemeral gallery that receives ephemeral messages from multiple users. Such a feature may be used to facilitate celebrity or organizational accounts where numerous authorized users are allowed to post on behalf of a single account. In one embodiment, a username, display name, contact email and contact phone are specified by an account administrator. An authorized accounts prompt 1102 allows the account administrator to add other users to the ephemeral gallery. For example, activation of the prompt 1102 may result in prompts for a username, display name, contact email and/or contact phone. Alternately, activation of the prompt 1102 may result in an interface of the type shown in FIG. 4 through which authorized accounts may be added.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method comprising:
   at a server system, maintaining a gallery comprising a plurality of ephemeral messages, each of which has respective visual media message content, the gallery being available for online viewing over a distributed computer network upon request via one or more recipient devices associated with respective recipients of the gallery;
   maintaining a plurality of message availability parameters corresponding to the plurality of ephemeral messages, each message availability parameter indicating a time value for continued availability of the respective corresponding ephemeral message for viewing as part of the gallery, wherein the maintaining of the plurality of message availability parameters comprises, for each of the plurality of ephemeral messages:
      responsive to receiving the respective ephemeral message for inclusion in the gallery, automatically assigning to the ephemeral message a respective message availability parameter that expires a default length of time subsequent to posting of the ephemeral message to the gallery; and
      posting the respective ephemeral message to the gallery, each ephemeral message having an associated posting time indicating the time of posting to the gallery;
   in response to receiving an online gallery view request from a requesting device forming part of the one or more recipient devices, causing automated sequential display of the gallery on the requesting device, the automated sequential display comprising displaying the respective visual media message content of the plurality of ephemeral messages in the gallery one after another in chronological sequence for respective non-overlapping display durations, wherein the chronological sequence of the automated sequential display is based on respective posting times such that an oldest ephemeral message, having an earliest posting time, is displayed first in the chronological sequence; and in an automated procedure performed using one or more computer processors configured therefor:
identifying expiry of one of the message availability parameters; and
at the server system, in response to the identifying of the expired message availability parameter, automatically removing from the gallery the ephemeral message that corresponds to the expired message availability parameter, so that the removed ephemeral message is automatically excluded from automated sequential display of the gallery responsive to subsequent online gallery view requests from any of the one or more recipient devices with respect to the gallery.

2. The method of claim 1, wherein each message availability parameter is a message availability timer.

3. The method of claim 1, wherein the gallery is an ephemeral gallery, the method further comprising eliminating the gallery upon expiry of a gallery availability parameter, the gallery being unavailable for viewing via the one or more recipient devices subsequent to elimination thereof.

4. The method of claim 3, wherein expiry of the gallery availability parameter corresponds to expiry of the message availability parameter of a last posted one of the plurality of ephemeral messages in the gallery.

5. The method of claim 3, wherein expiry of the gallery availability parameter corresponds to expiry of a gallery timer.

6. The method of claim 3, wherein expiry of the gallery availability parameter corresponds to an earliest occurring one of:
expiry of the message availability parameter of a last posted one of the plurality of ephemeral messages in the gallery; and
expiry of a gallery timer.

7. The method of claim 1, wherein the maintaining of the gallery further comprises maintaining for each of the plurality of ephemeral messages an associated message display parameter that indicates a respective display duration for the corresponding message during viewing of the gallery.

8. The method of claim 7, wherein the causing of the automated sequential display comprises:
starting a message timer when viewing of one of the plurality of ephemeral messages is commenced;
determining that the message timer expires when the message timer equals the corresponding message display parameter;
responsive to expiry of the message timer, causing display of a next one of the plurality of ephemeral messages in the gallery; and
repeating the starting, determining, and causing display operations until all ephemeral messages in the gallery are viewed.

9. The method of claim 1, further comprising:
receiving user input indicating one or more destinations for a newly posted ephemeral message; and
associating the newly posted ephemeral message with the one or more destinations indicated by the user input.

10. The method of claim 9, wherein the one or more destinations include the gallery and one or more designated individuals as the recipients of the gallery.

11. A system comprising:
one or more computer processors; and
one or more memories storing instructions executed by the one or more computer processors to configure the one or more computer processors to perform automated operations comprising:
at a server system, maintaining a gallery comprising a plurality of ephemeral messages, each of which has respective visual media message content, the gallery being available for online viewing over a distributed computer network upon request via one or more recipient devices associated with respective recipients of the gallery;
maintaining a plurality of message availability parameters corresponding to the plurality of ephemeral messages, each message availability parameter indicating a time value for continued availability of the respective corresponding ephemeral message for viewing as part of the gallery, wherein the maintaining of the plurality of message availability parameters comprises, for each of the plurality of ephemeral messages:
responsive to receiving the respective ephemeral message for inclusion in the gallery, automatically assigning to the ephemeral message a respective message availability parameter that expires a default length of time subsequent to posting of the ephemeral message to the gallery; and
posting the respective ephemeral message to the gallery, each ephemeral message having an associated posting time indicating the time of posting to the gallery;
in response to receiving an online gallery view request from a requesting device forming part of the one or more recipient devices, causing automated sequential display of the gallery on the requesting device, the automated sequential display comprising displaying the respective visual media message content of the plurality of ephemeral messages in the gallery one after another in chronological sequence for respective non-overlapping display durations, wherein the chronological sequence of the automated sequential display is based on respective posting times such that an oldest ephemeral message, having an earliest posting time, is displayed first in the chronological sequence;
identifying expiry of one of the message availability parameters; and
at the server system, in response to the identifying of the expired message availability parameter, automatically removing from the gallery the ephemeral message that corresponds to the expired message availability parameter, so that the removed ephemeral message is automatically excluded from automated sequential display of the gallery responsive to subsequent online gallery view requests from any of the one or more recipient devices with respect to the gallery.

12. The system of claim 11, wherein each message availability parameter is a message availability timer.

13. The system of claim 11, wherein the gallery is an ephemeral gallery, the instructions executed by the one or more computer processors further comprising instructions to eliminate the gallery upon expiry of a gallery availability parameter, the gallery being unavailable for viewing via the one or more recipient devices subsequent to elimination thereof.

14. The system of claim 13, wherein expiry of the gallery availability parameter corresponds to an earliest occurring one of:
   expiry of the message availability parameter of a last posted one of the plurality of ephemeral messages in the gallery; and
   expiry of a gallery timer.

15. The system of claim 13, wherein instructions executed by the one or more computer processors further comprise instructions to:
   cause display on a client device of a gallery UI for the gallery; and
   cause display in the gallery UI of gallery activity indicia that include graphical indicia of an amount of time remaining before expiry of the gallery availability parameter.

16. The system of claim 11, wherein the instructions executed by the one or more computer processors further comprise instructions to:
   cause display on a client device of a gallery user interface (UI) for the gallery; and
   cause display in the gallery UI of gallery activity indicia.

17. The system of claim 16, wherein the gallery activity indicia include indicia of the respective posting time of a last posted one of the plurality of ephemeral messages in the gallery.

18. A non-transitory computer readable storage medium storing instructions for causing a machine, when executing the instructions, to perform operations comprising:
   at a server system, maintaining a gallery comprising a plurality of ephemeral messages, each of which has respective visual media message content, the gallery being available for online viewing over a distributed computer network upon request via one or more recipient devices associated with respective recipients of the gallery;
   maintaining a plurality of message availability parameters corresponding to the plurality of ephemeral messages, each message availability parameter indicating a time value for continued availability of the respective corresponding ephemeral message for viewing as part of the gallery, wherein the maintaining of the plurality of message availability parameters comprises, for each of the plurality of ephemeral messages:
      responsive to receiving the respective ephemeral message for inclusion in the gallery, automatically assigning to the ephemeral message a respective message availability parameter that expires a default length of time subsequent to posting of the ephemeral message to the gallery; and
      posting the respective ephemeral message to the gallery, each ephemeral message having an associated posting time indicating the time of posting to the gallery;
   in response to receiving an online gallery view request from a requesting device forming part of the one or more recipient devices, causing automated sequential display of the gallery on the requesting device, the automated sequential display comprising displaying the respective visual media message content of the plurality of ephemeral messages in the gallery one after another in chronological sequence for respective non-overlapping display durations, wherein the chronological sequence of the automated seauential displav is based on respective posting times such that an oldest ephemeral message, having an earliest posting time, is displayed first in the chronological sequence;
   identifying expiry of one of the message availability parameters; and
   at the server system, in response to the identifying of the expired message availability parameter, automatically removing from the gallery the ephemeral message that corresponds to the expired message availability parameter, so that the removed ephemeral message is automatically excluded from automated sequential display of the gallery responsive to subsequent online gallery view requests from any of the one or more recipient devices with respect to the gallery.

* * * * *